(12) United States Patent
Myoung

(10) Patent No.: US 7,192,174 B2
(45) Date of Patent: Mar. 20, 2007

(54) LIGHT GUIDING PANEL FORMED WITH MINUTE RECESSES BY A SAND BLASTING PROCESS AND A BACKLIGHT UNIT USING THE SAME

(75) Inventor: Bum Young Myoung, Inchun (KR)

(73) Assignee: Hunatech Co., Ltd. (KR)

( * ) Notice: Subject to any disclaimer, the term of this patent is extended or adjusted under 35 U.S.C. 154(b) by 77 days.

(21) Appl. No.: 10/509,840

(22) PCT Filed: Jan. 1, 2003

(86) PCT No.: PCT/KR03/00653

§ 371 (c)(1),
(2), (4) Date: Sep. 30, 2004

(87) PCT Pub. No.: WO03/083564

PCT Pub. Date: Oct. 9, 2003

(65) Prior Publication Data

US 2005/0169009 A1    Aug. 4, 2005

(30) Foreign Application Priority Data

Apr. 1, 2002 (KR) .................. 10-2002-0017843
Nov. 22, 2002 (KR) .................. 10-2002-0073173

(51) Int. Cl.
*G02F 1/1335* (2006.01)
*F21V 7/04* (2006.01)
*F21V 8/00* (2006.01)

(52) U.S. Cl. ............... 362/561; 362/623; 362/625

(58) Field of Classification Search ............. 362/561, 362/558, 600, 603, 615, 623, 625, 626
See application file for complete search history.

(56) References Cited

U.S. PATENT DOCUMENTS 5,178,447 A * 1/1993 Murase et al. ............ 362/621
5,641,219 A * 6/1997 Mizobe .................... 362/623
6,243,150 B1 * 6/2001 Watanabe et al. ......... 349/65
6,386,721 B1 * 5/2002 Hosseini et al. .......... 362/619
6,425,673 B1 * 7/2002 Suga et al. ................ 362/613

FOREIGN PATENT DOCUMENTS

JP        06-230380     8/1994
JP        08-160229     6/1996

OTHER PUBLICATIONS

International Search Report dated Jun. 17, 2003 issued in connection with corresponding application No. PCT/KR03/00653.

* cited by examiner

*Primary Examiner*—Alan Cariaso
(74) *Attorney, Agent, or Firm*—Ostrolenk, Faber, Gerb & Soffen, LLP

(57) ABSTRACT

Disclosed is a light guiding plate formed with fine recesses and a backlight unit utilizing the same. There are formed on a bottom surface of a transparent acryl resin substrate a number of fine recesses, which are unable to be distinguished with the naked eye, in order to reflect on front surface of the plate a source light introduced through at least one side surface. The fine recesses are formed by means of a sandblasting process. The amount of the fine recesses jetted per unit hour is uniformly maintained. The number of sands collided into unit area per unit hour and impact energy of the sands are higher the further away from the side through the source light is introduced. Accordingly, density, average depth and average size of the recesses are gradually higher the further away from the light introduced side. Also, area, average complexity of the contour of the recesses and average complexity of the surface profile of the recesses are increased. Therefore, as a light getting out of the front surface of the plate is uniformly diffused, a diffusion sheet is not needed in composing a backlight unit for an advertising film or a LCD panel by utilizing the plate.

15 Claims, 46 Drawing Sheets
(12 of 46 Drawing Sheet(s) Filed in Color)

SAMPLE 1 (42a)

SAMPLE 3 (42c)

SAMPLE 4 (42d)

SAMPLE 1 (42a)

SAMPLE 2 (42b)

SAMPLE 3 (42c)

SAMPLE 4 (42d)

SAMPLE 5 (42e)

NO RECESS AREA   RECESS FORMING AREA

FIG. 19

| RECESS DISTRIBUTION | | | |
|---|---|---|---|
| | 35x | 35y | 35z |
| DISTRIBUTION PHOTO | | | |
| RECESS SIZE (μm) | 10 ~ 40 | 15 ~ 50 | 20 ~ 60 |
| RECESS DEPTH (μm) | 100 | 140 | 200 |
| DISTRIBUTION (ea/mm²) | 54 | 120 | 180 |

LIGHT GUIDING PANEL FORMED WITH MINUTE RECESSES BY A SAND BLASTING PROCESS AND A BACKLIGHT UNIT USING THE SAME

CROSS REFERENCE TO RELATED APPLICATION

This is a U.S. National stage of application No. PCT/KR03/00653, filed on 1 Apr. 2003.

Priority is claimed on that application and on the following application:
Country: Korea, Application No. 10-2002-0017843, Filed: Apr. 1, 2002
Country: Korea, Application No. 10-2002-0073173 Filed: Nov. 22, 2002

The PCT International application was published in the English language.

1. Technical Field

The present invention relates to a light guiding panel, and more particularly, to a light guiding panel in which minute recesses are formed as a gradation pattern on one surface of the panel such that the uniformity of the surface brightness is superior and a light diffusion sheet is not needed accordingly.

2. Background Art

A liquid crystal display (LCD) panel or an advertising plastic film cannot emit light itself and therefore requires a backlight. A light guiding panel is one of core elements forming the backlight unit and converts light of a tube lamp into light of flat optical sources.

Methods for forming a backlight unit are broken down to a direct-type method and a light guiding panel method according to the location of an optical source. The direct-type method places the optical source directly below a light emitting surface so as to guarantee planar light emission, while the light guiding panel method places an optical source at a side of a light guiding panel so that light which is incident on the side of the panel is guided to be reflected to the front surface of the light guiding panel in order to guarantee planar light emission. The present invention is applied to the light guiding panel method.

Among conventional light guiding panel manufacturing technologies applied to LCD backlight unit, there are a dot pattern printing method using a silkscreen printing technology and a V-cut method using a machine tool. In the silkscreen printing method, dots are formed on the bottom surface of a light guiding panel by a silkscreen printing method and minute glass beads are put inside the dots such that light is scattered on the surfaces of glass beads and scattered light passes the top surface of the light guiding panel. This method is a stable technology that has been used for tens of years, but the resolution of a film, and the kind, tension, and angle of gauze during an engraving process are closely related to the dot size and pitch of a light guiding panel desired to be printed. Accordingly, identifying and adjusting these correlations need much know-how. In addition, the printing process is complex and many defections may occur during the printing process. In the V-cut method, V-shaped grooves are directly made on a transparent acryl resin substrate by a machine tool such that light which is incident on the side of the panel is reflected to the front surface of the light guiding panel.

However, in the light guiding panels made by the dot pattern printing method or V-cut method, the scatter light reflected by the dots or V-grooves is emitted to the front surface of the light guiding panel such that the reflection pattern is seen as is on the light guiding panel. That is, since the reflection pattern, which is the reflected dots or V-grooves, is of a size enough to be seen with the naked eye, so-called light spots, in which bright parts or dark parts are locally mixed and coexisting, appear on the front surface of the light guiding panel. Without removing these light spots, the light guiding panel is not appropriate to be used for a backlight unit.

In order to remove the light spots, a diffusion sheet or a diffusion sheet plus a prism sheet is generally attached on the front surface of a light guiding panel. If a diffusion sheet is used, an appropriate amount of light is made to be spread such that the uniformity of brightness can improve. However, since the light transmission factor of a diffusion sheet is usually about 68%, employing a diffusion sheet and the like causes an adverse effect of light loss, the optical efficiency is degraded, and the brightness of the backlight is lowered, accordingly.

In order to improve optical efficiency, a light guiding panel which does not need a diffusion sheet and the like is required. For this, a variety of research activities, have been proceeding recently, including researches on a method for directly molding a light guiding panel having a light scattering function by using a mold for manufacturing a transparent resin substrate which is part of a light guiding panel, the mold whose surface is processed by laser, sandblast, or erosion. However, these researches are still in the laboratory experiment stages and there has been no evidence that any such method is applied to commercial production of a light guiding panel and attracts buyers' eyes. The reason is not clear, but the market related to manufacturing a light guiding panel demands establishment of a mass production system according to automation of light guiding panel production and achievement of production cost reduction no less than achieving the uniformity and stability of brightness distribution of light emitting from a light guiding panel. However, the conventional technologies for manufacturing light guiding panels cannot satisfy these demands well. In addition, when a light guiding panel is used for a backlight of an advertising transparent film, the recesses formed on the light guiding panel should be formed to satisfy appropriate requirements on the distribution, the average size and depth of recesses. However, a method to satisfy these requirements has not been found, which is thought to be another factor preventing the above technologies from succeeding in the market.

DISCLOSURE OF INVENTION

To solve the above problems, it is a first objective of the present invention to provide a light guiding panel in which even without using a diffusion sheet, light spots that can be seen with the naked eye do not occur at all and light is uniformly diffused such that light with high uniformity of brightness is obtained and optical efficiency is also high.

It is a second objective of the present invention to provide a backlight unit using the light guiding panel.

According to an aspect of the present invention to achieve the first objective, there is provided a light guiding panel which is made as a transparent substrate of a thin hexahedron shape and reflects source light that is incident through at least one side so that the light is emitted to the front surface of the substrate, wherein countless minute recesses are formed on the bottom surface of the substrate in order to reflect the source light to the front surface, and the density, average depth, and average size of the recesses gradually increase respectively, as a distance from the vicinity of the side, through which the source light is incident, increases.

In the light guiding panel, the area of each of the recesses also gradually increases as a distance from the vicinity of the side, through which the source light is incident, increases.

In addition, in the light guiding panel, the average complexity of the contours of the recesses and a recess surface profile gradually increases as a distance from the vicinity of the side, through which the source light is incident, increases.

In the light guiding panel, the recesses of the substrate are formed by a sandblasting method. The sandblasting method is a method by which a constant amount of minute particles injected in a unit time is maintained and the number of sands impinging on a unit area of the bottom surface of the substrate in a unit time and the impact of the sands gradually increase as a distance from the vicinity of the side, through which the source light is incident, increases. Furthermore, when recesses are processed by using the sandblasting method, in order to maintain a constant amount of injected minute particles, minute particles are made to follow a stage of free-falling in a process for injecting the minute particles.

In the light guiding panel, the recesses are a minute size that is hardly seen with the naked eye and light spots that can be seen with the naked eye do not appear on the front surface of the light guiding panel even without placing a diffusion sheet thereon.

According to an aspect of the present invention to achieve the second objective, in addition to the light guiding panel described above, there is provided a backlight apparatus using the light guiding panel having recesses formed thereon of any one of claims 1 through 7, comprising: a tube optical source which is arranged parallel to and along at least any one side or both sides of the light guiding panel, and if electric power is supplied, generates light so that the light is incident into the light guiding panel through the side of the light guiding panel; a reflection portion which surrounds the optical source such that the light of the optical source is reflected into the light guiding panel; a bottom surface reflection plate which is attached to the bottom surface of the light guiding panel so as to reflect light which passes through the bottom surface, back into the light guiding panel; and a side reflection plate which is attached to sides of the light guiding panel, at which the optical source is not installed, and reflects light incident on the side reflection plate into the light guiding panel, wherein without placing a diffusion sheet on the front surface of the light guiding panel, the backlight apparatus is used as a backlight for a transparent or translucent printed film or a liquid crystal display (LCD) unit.

Preferably, the backlight apparatus further comprises an assembly frame which accommodates the light guiding panel, the tube optical source coupled with the light guiding panel, the reflection portion, the bottom surface reflection plate, and the side reflection plate, so as to form a single body apparatus.

BRIEF DESCRIPTION OF DRAWINGS

The patent or application file contains at least one drawing executed in color. Copies of this patent or patent application publication with color drawing(s) will be provided by the Office upon request and payment of the necessary fee.

The above objects and advantages of the present invention will become more apparent by describing in detail preferred embodiments thereof with reference to the attached drawings in which:

FIG. 19 shows microphotographs taken with enlarging the distribution of recesses in three sample areas on a light guiding panel actually processed according to the present invention;

BEST MODE FOR CARRYING OUT THE INVENTION

<Light Guiding Panel>

Figure 1A:
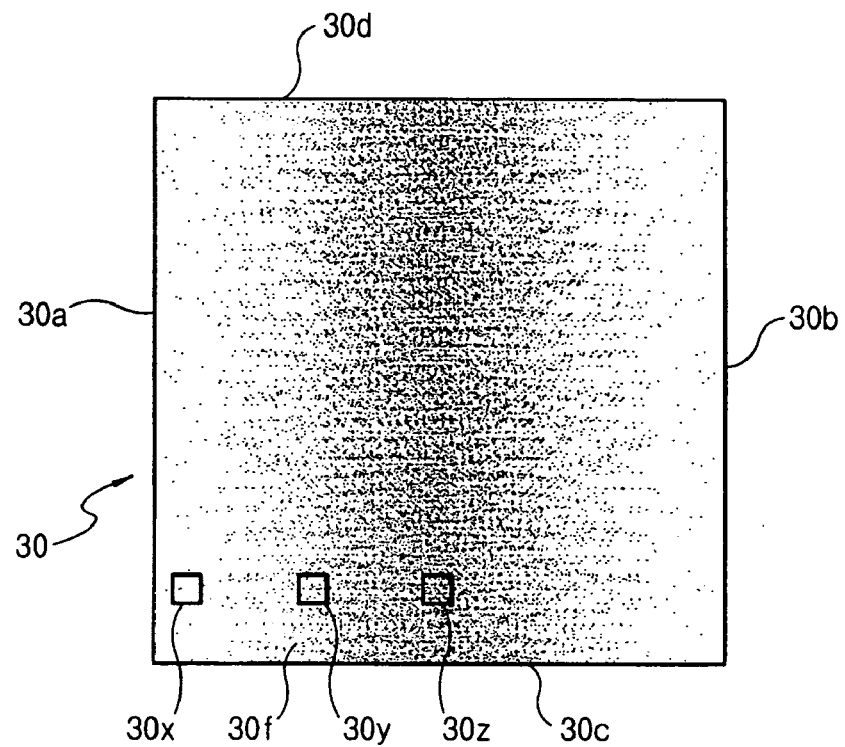
FIGS. 1a and 1b are diagrams of light guiding panels having minute recesses formed thereon according to the present invention.
Figure 1B:
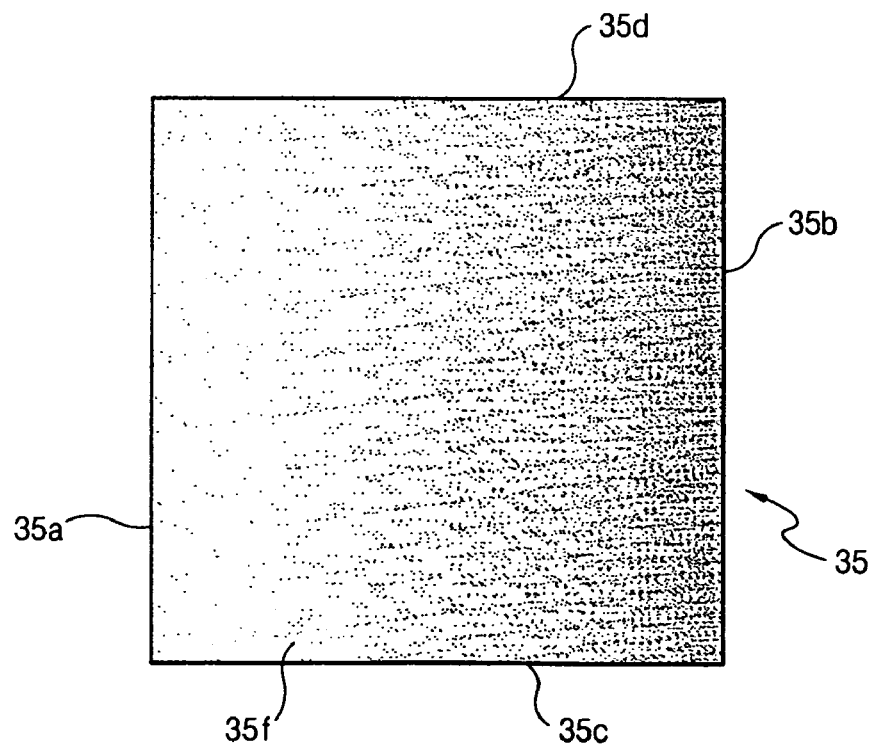
Figure 2:
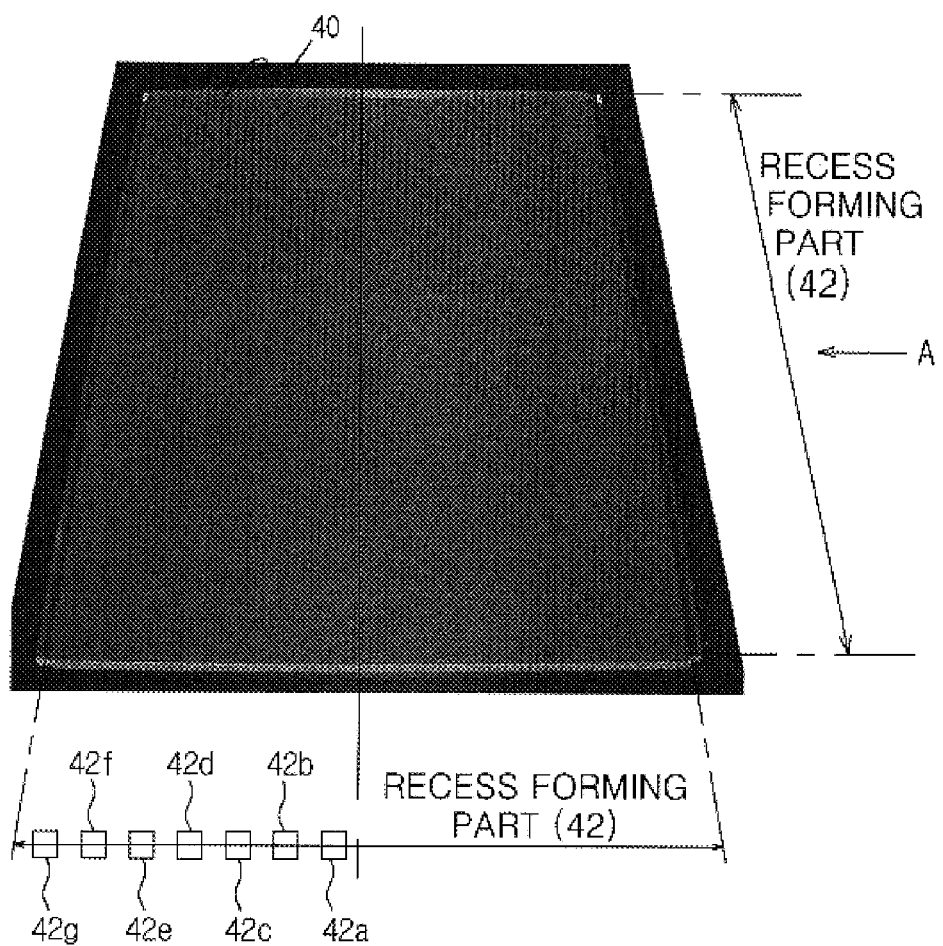
FIG. 2 is a photo by a digital camera of a light guiding panel which is actually processed so as to satisfy the requirements of a recess profile according to the present invention.
Figure 3A:
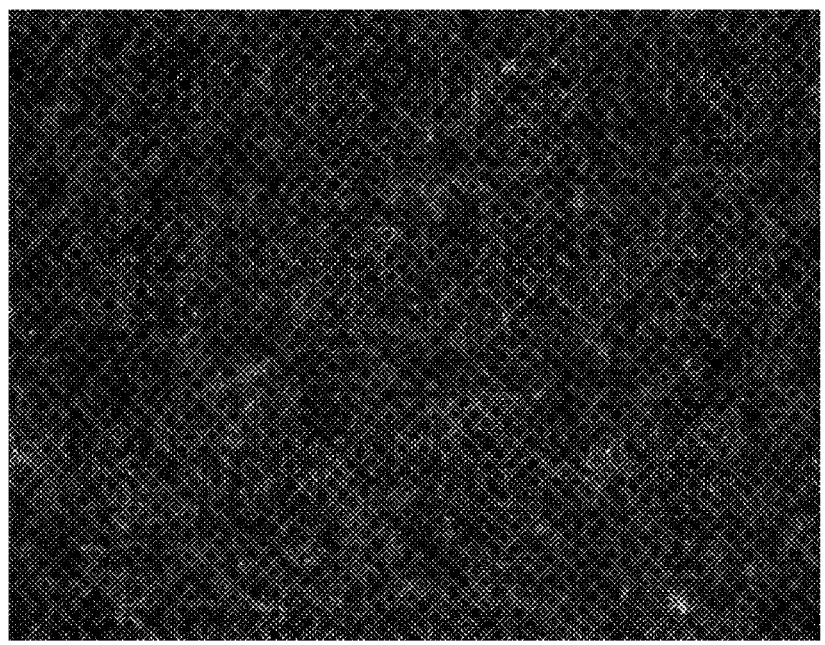
FIGS. 3a through 3g are photos by a scanning electron microscope (SEM) of the surfaces of seven respective samples (42a through 42g), which are of an appropriate size and are taken at each predetermined interval along a straight line extended from arrow A in FIG. 2 in the direction from the center of the light guiding panel to the left hand side.
Figure 3B:
Figure 3C:
Figure 3D:
Figure 3E:
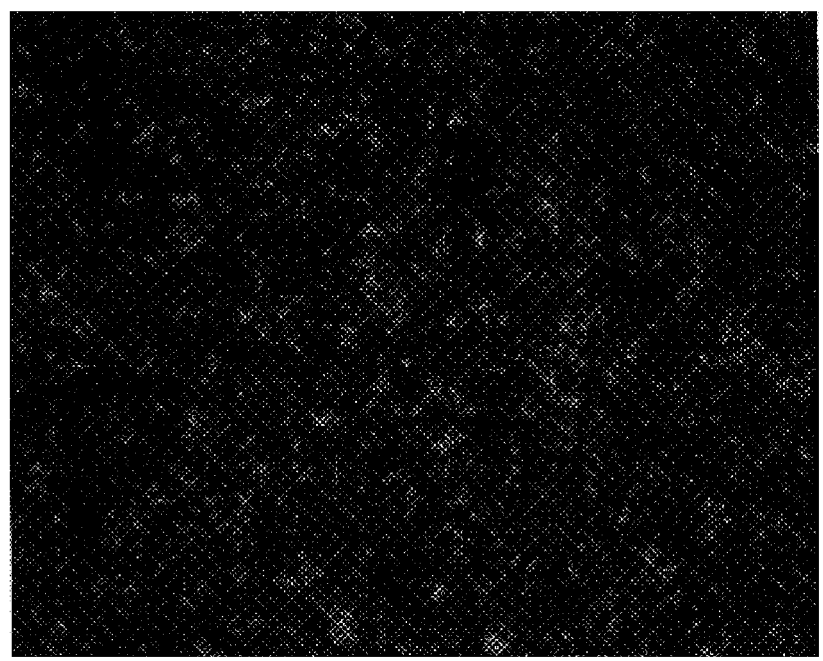
Figure 3F:
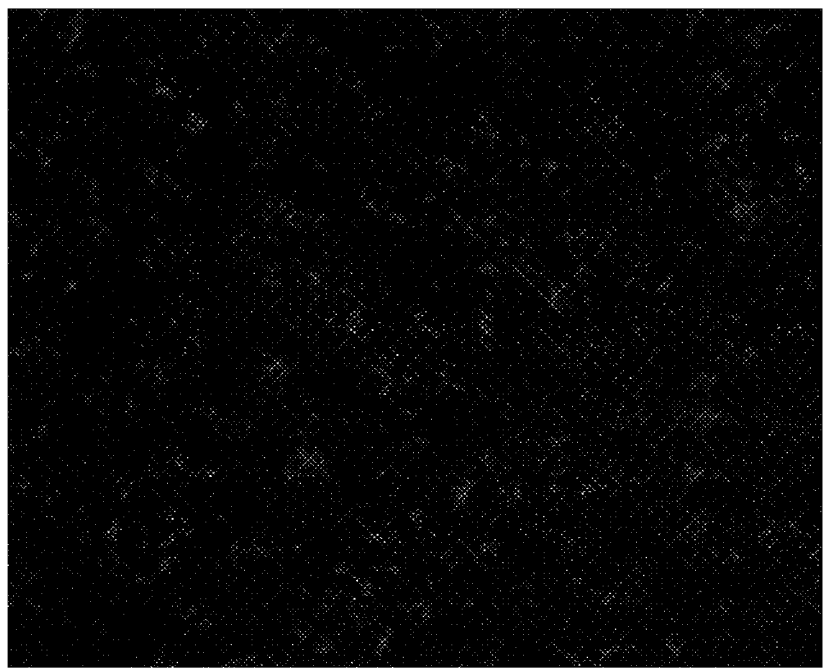
Figure 3G:
Figure 4A:
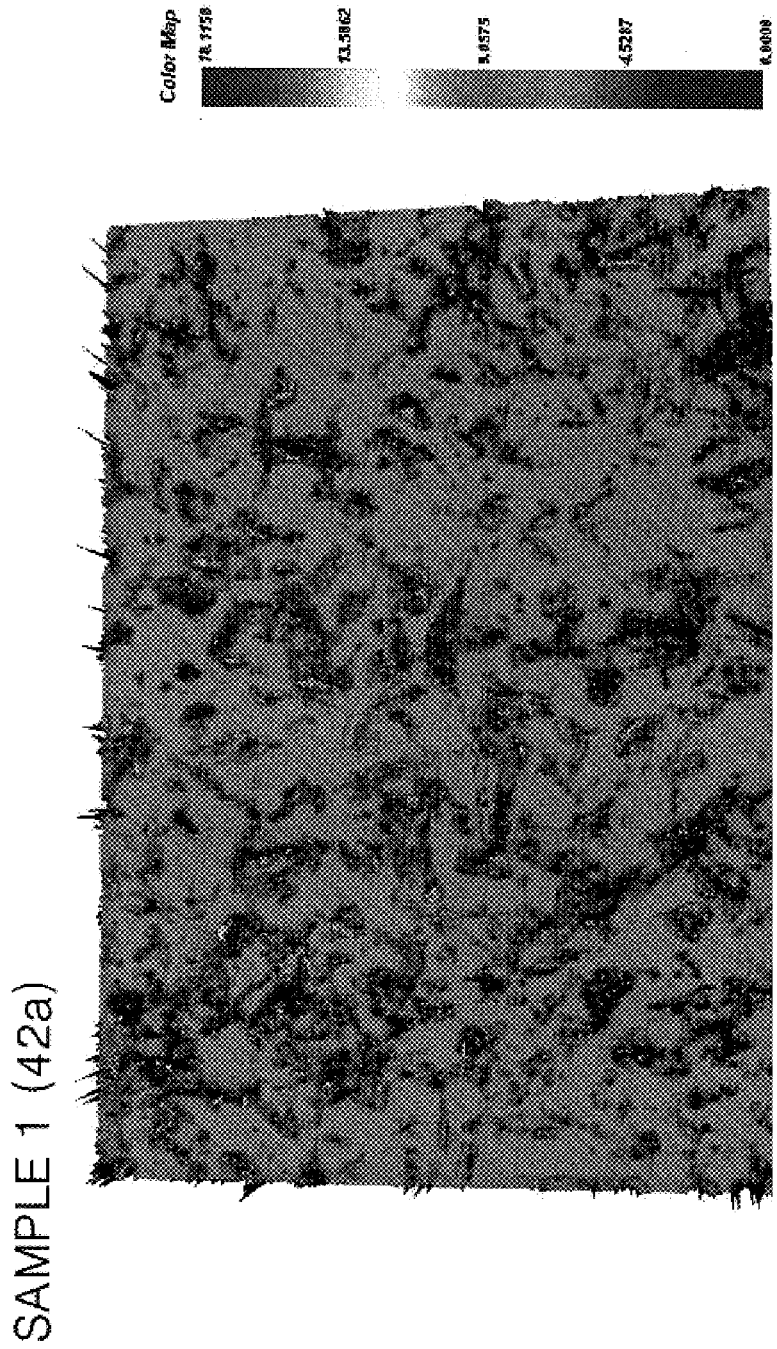
FIGS. 4a through 4g are photos of 3 dimensional surface shapes of predetermined parts of the seven samples, the photos which are taken by using light interference, after determining the parts of respective samples in order to perform more precise observation on the surface profiles of the seven samples.
Figure 4B:
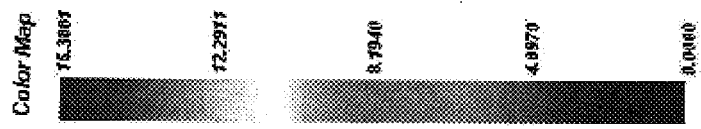
Figure 4B:
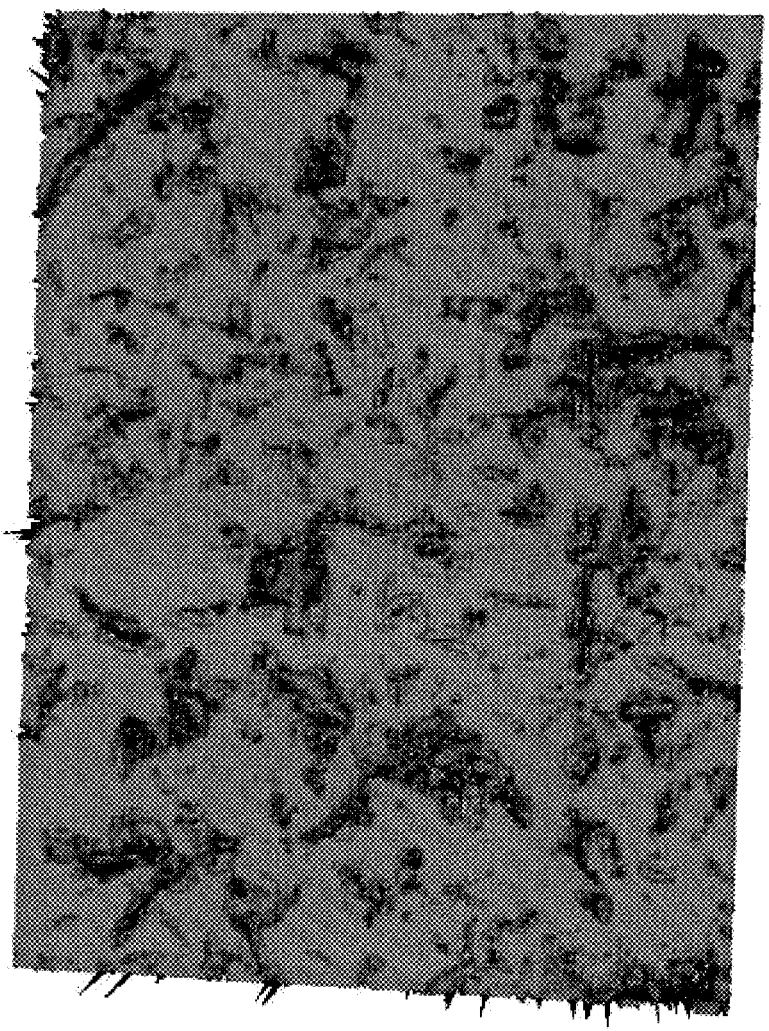
Figure 4C:
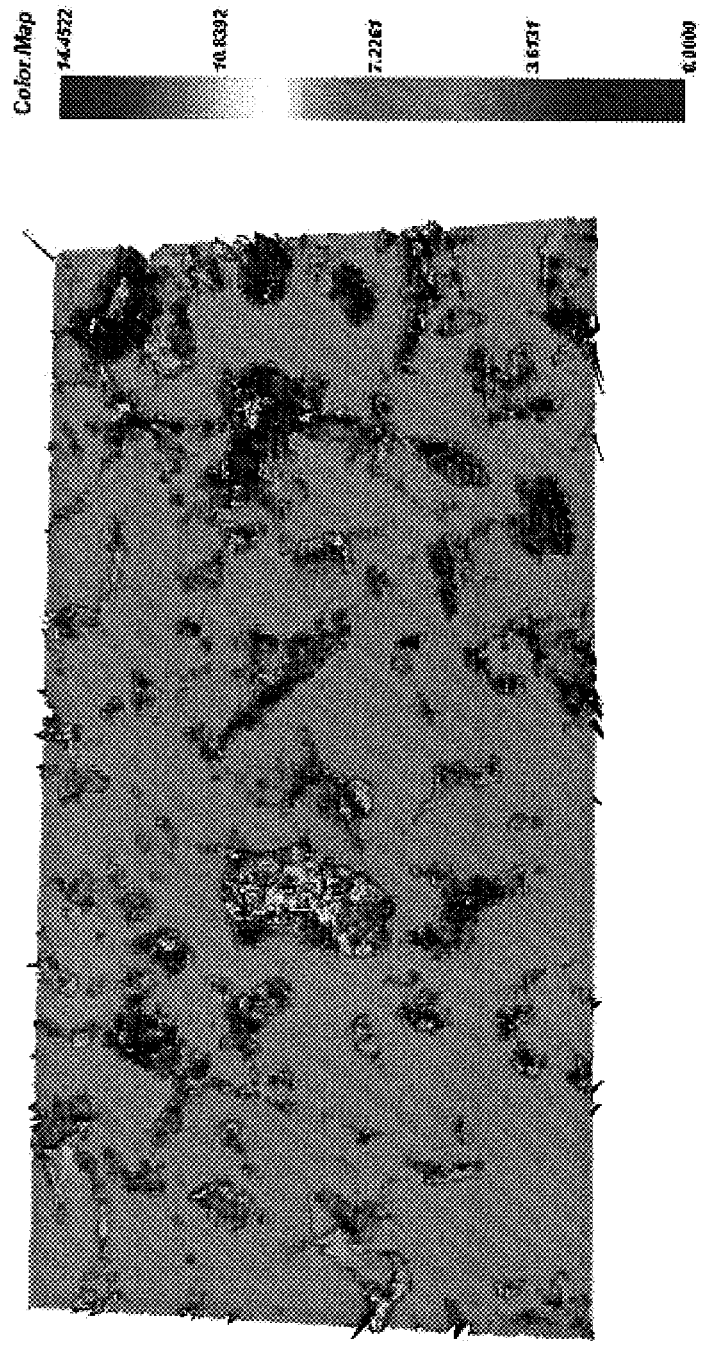
Figure 4D:
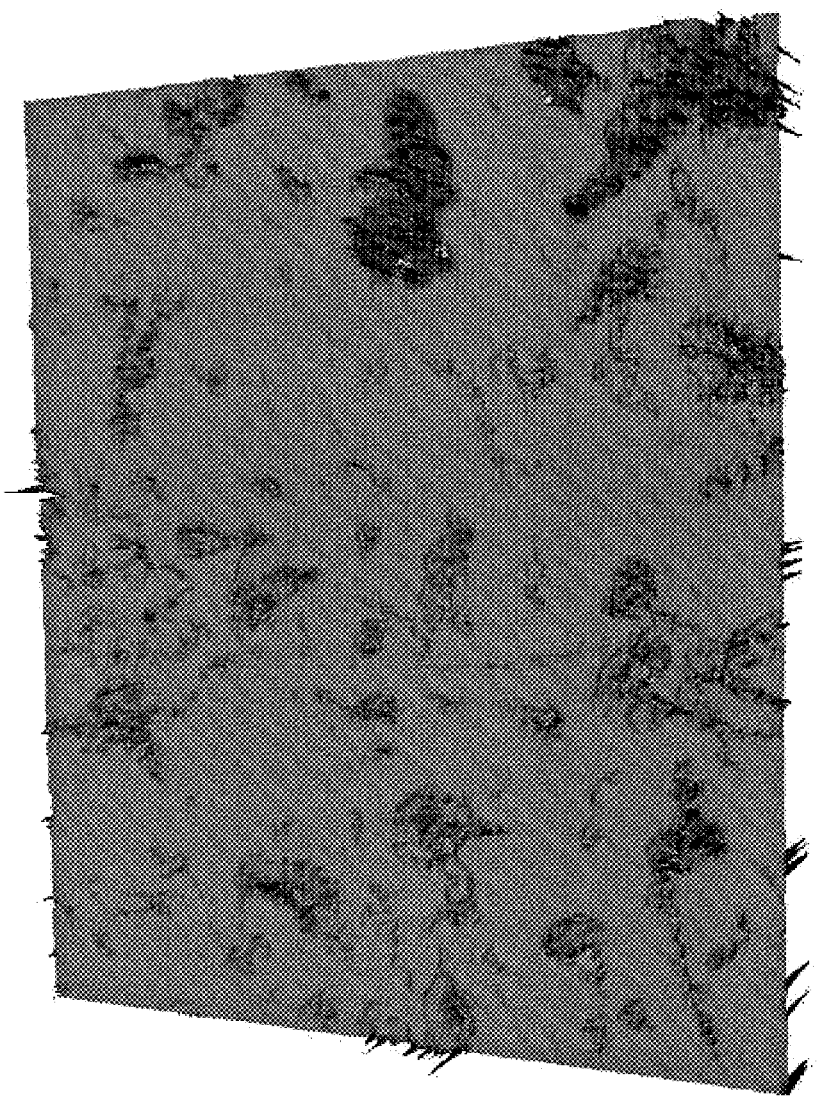
Figure 4E:
Figure 4E:
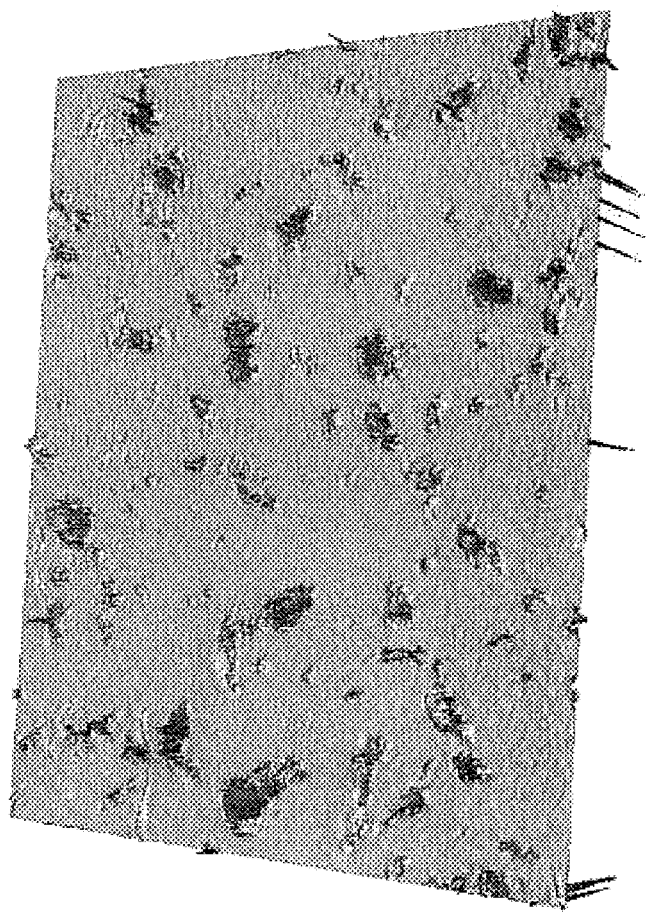
Figure 4F:
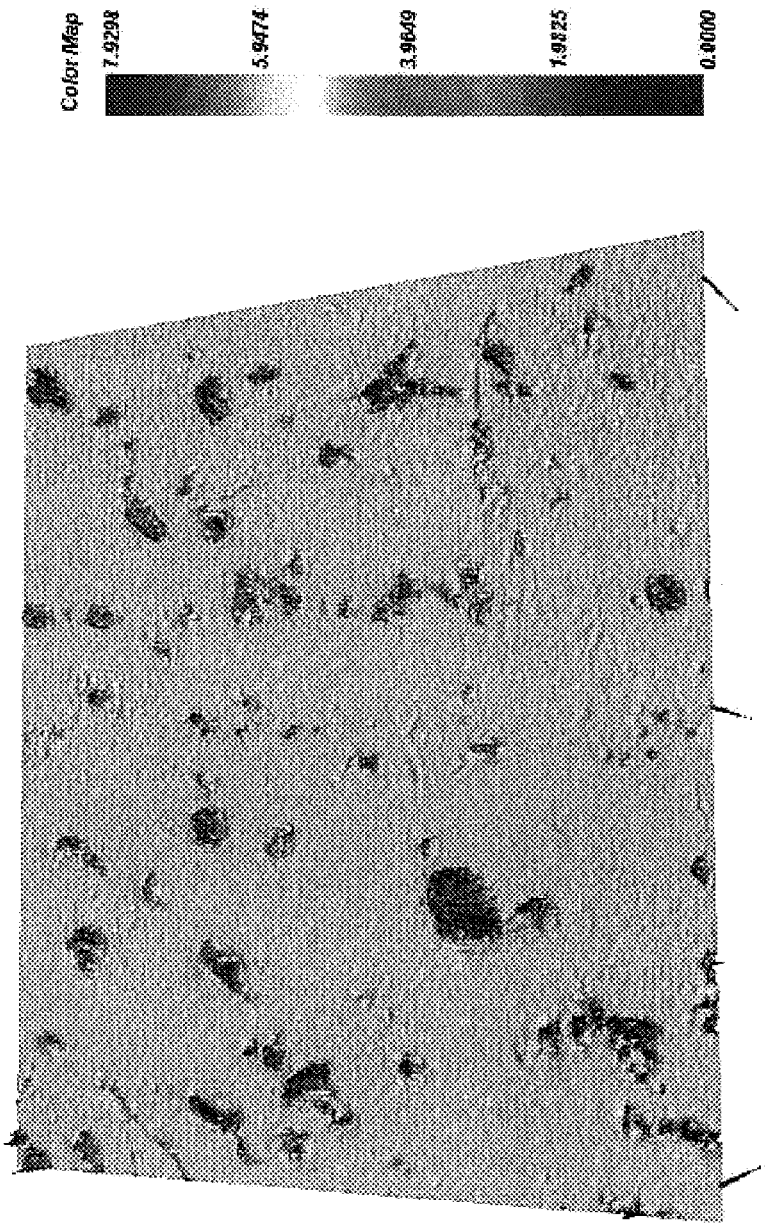
Figure 4G:
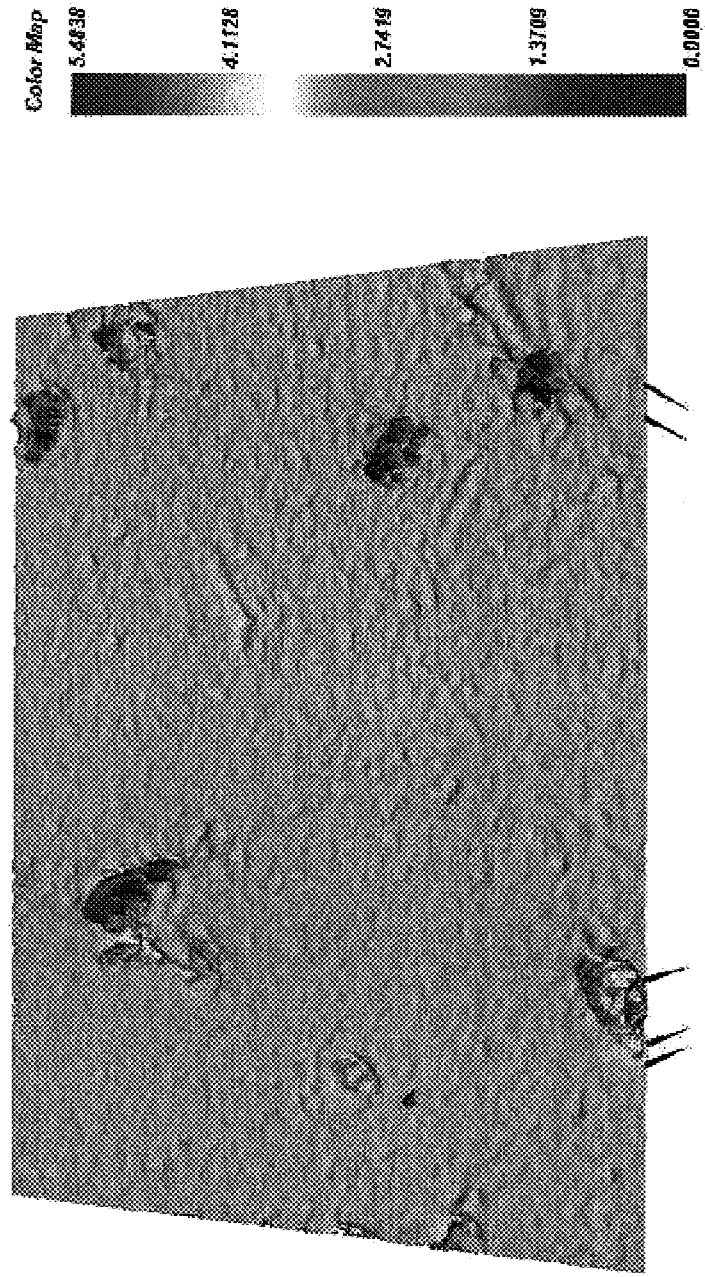
Figure 5A:
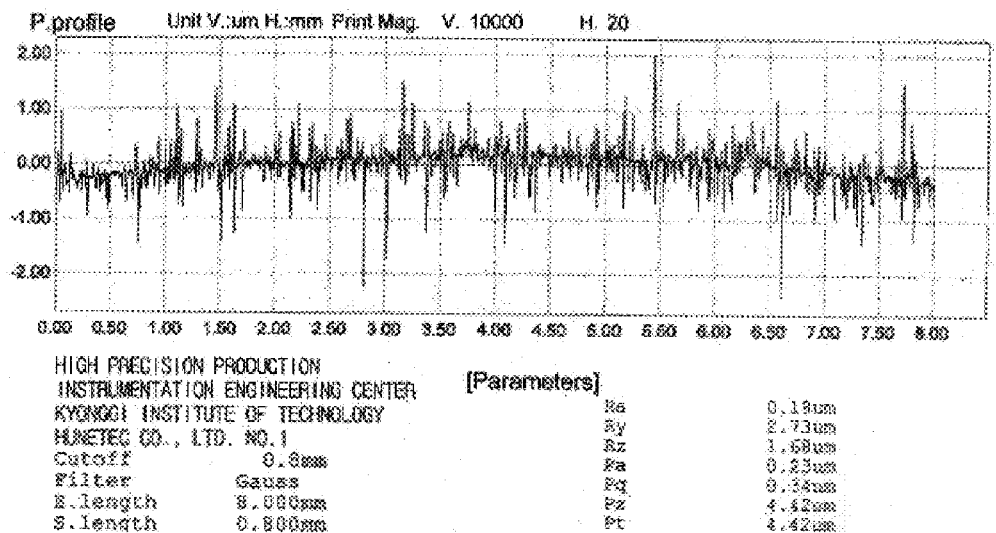
FIGS. 5a through 5g are graphs showing surface illumination data obtained by measuring an 8 mm interval of each of the seven samples.
Figure 5B:
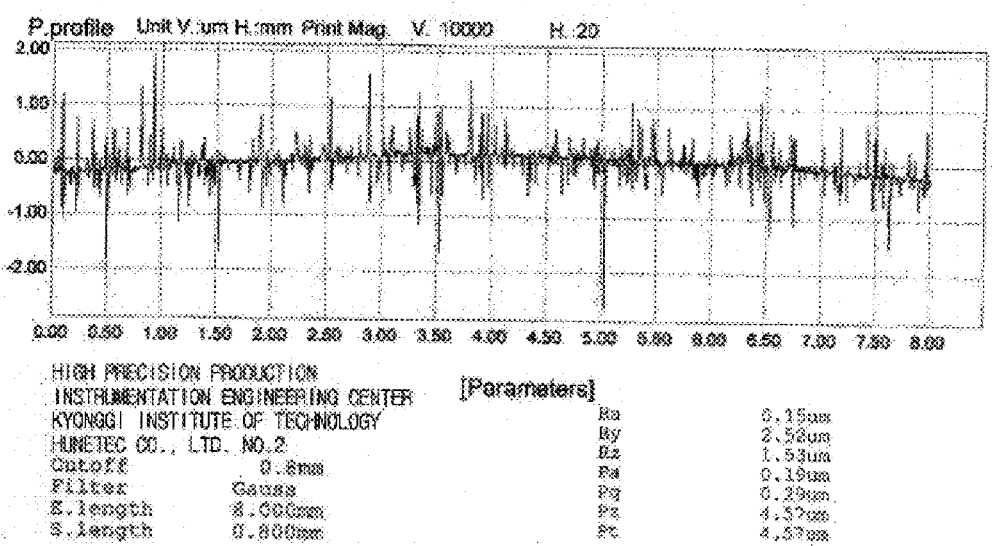
Figure 5C:
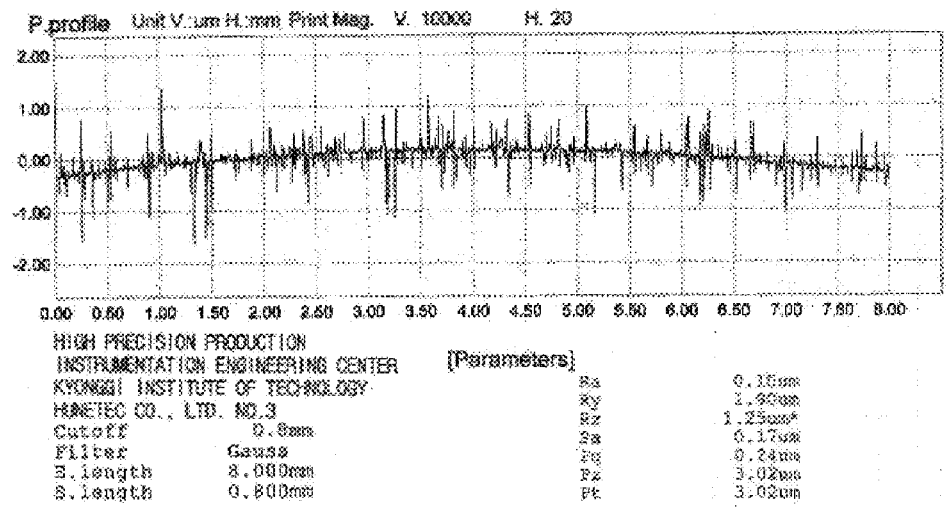
Figure 5D:
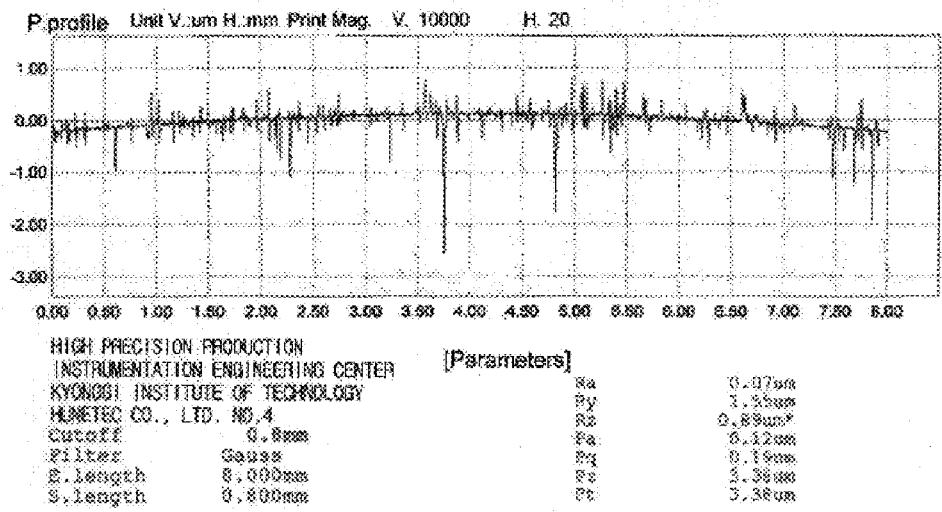
Figure 5E:
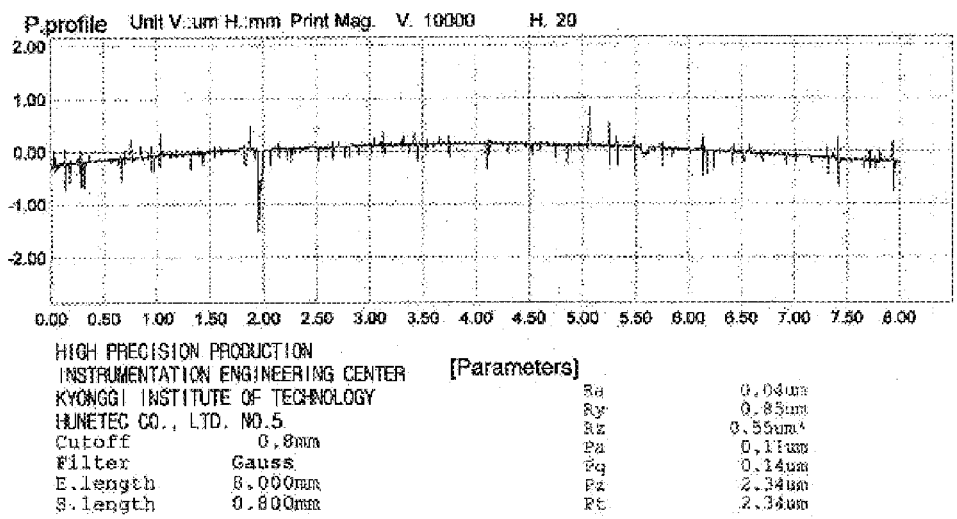
Figure 5F:
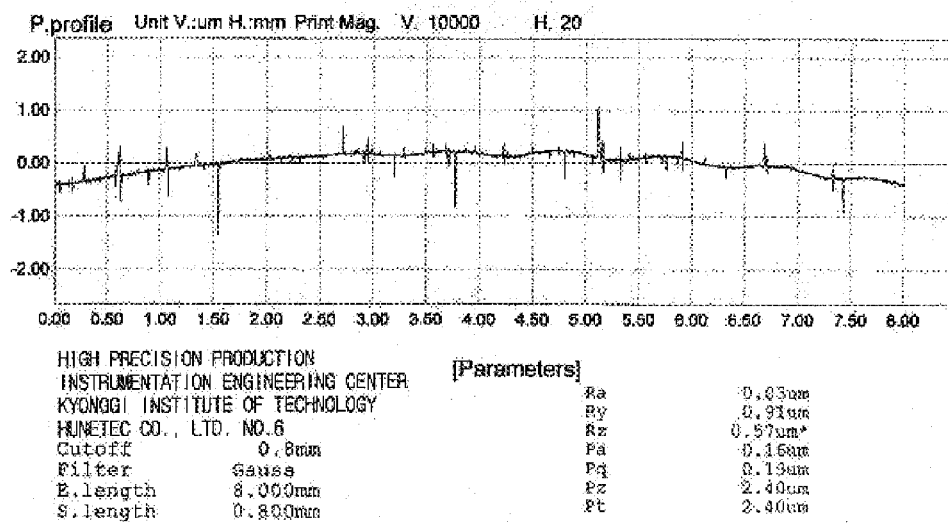
Figure 5G:
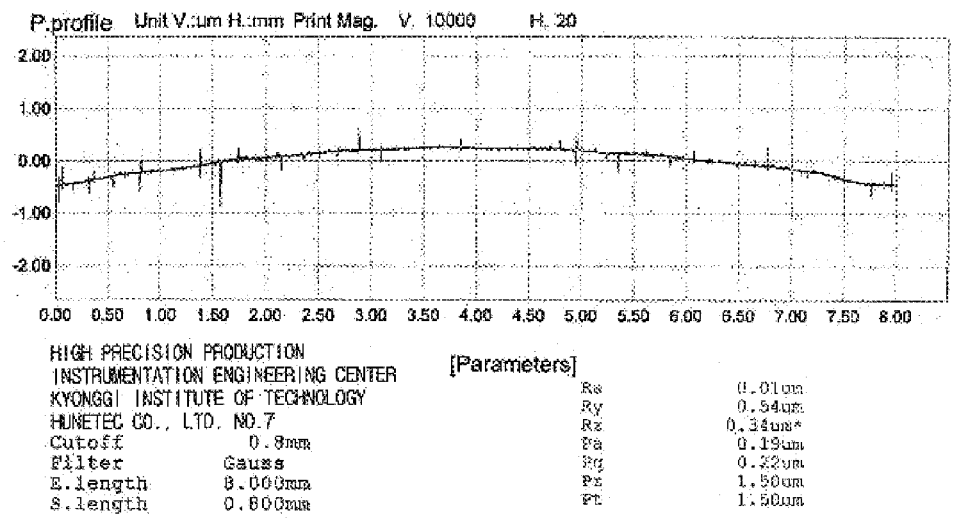

As shown in FIGS. 1a and 1b, on one surface (hereinafter referred to as a 'bottom surface') of a light guiding panel according to the present invention, minute recesses are formed as a gradation pattern. The distribution of recesses formed on the light guiding panel varies depending on light incidence methods. In the light guiding panel 30 of FIG. 1a, two sides 30a and 30b of the light guiding panel 30 are light incidence surfaces, while in the light guiding panel 35 of FIG. 1b, one side 35a of the light guiding panel 35 is a light incidence surface. The light guiding panels shown in FIGS. 1a and 1b are just conceptually illustrated to help understand the concept of the present invention, and it should be noted that there is differences between these figures and the shape of an actual light guiding panel according to the present invention. In an actual light guiding panel (as shown in the photo of FIG. 2) according to the present invention, the recesses formed on the bottom surface of the actual light guiding panel 40 are of a size that cannot be seen with the naked eye. Accordingly, the part on which recesses are formed (all the surface except some areas with a predetermined width from each edge) is seen hazy and translucent in general.

Through manufacturing and measuring so many pilot products related to the light guiding panel, the present inventor has extracted optimal requirements that, even without using a diffusion sheet, can prevent light spots due to a reflection pattern from occurring on the bottom surface of the light guiding panel and at the same time can guarantee high uniformity of brightness on the entire front surface. They are some requirements on the profile of recesses formed on the bottom surface of the light guiding panels, as follows. The strength of light greatly decreases as a distance from an optical source increases, and this principle also applies to the inside of the light guiding panel. Considering this fact, in order to make any area of the bottom surface of the light guiding panel get even brightness, the characteristics of recesses to be formed on the bottom surface of the light guiding panel should satisfy the following requirements.

First, when recesses are formed, it is needed to make the density, average depth and average size of recesses, which are to be formed on the bottom surface of the light guiding panel, have relatively smaller values in the vicinity of an optical source, and to make these attributes gradually increase as a distance from the optical source increases so that though the strength of light decreases, more rays of light can be reflected to the bottom surface of the light guiding panel. That is, the first requirement is that as a distance from a side, at which a tube lamp, that is, the optical source, is installed, increases, the density, average depth, and average size of minute recesses formed on the bottom surface of the light guiding panel should increase. If as a distance from the optical source increases, the values of these three attributes increase and then decrease, light spots occur on the part where the change occurred. Accordingly, a process for forming recesses on a light guiding panel should satisfy this requirement. As also mentioned in the description of the related art, the reason why the light guiding panel using forming minute recesses couldn't succeed is thought to be that a manufacturing process satisfying the above requirement has not been found.

The second requirement is that the size of recesses formed on the bottom surface of the light guiding panel should be very small enough not to be seen with the naked eye. This is because if the size of recesses is not this small, when a local area is seen, bright areas and dark areas are mixed and coexisting such that light spots are seen. This light spots affect using the light guiding panel without a diffusion sheet for a backlight of an advertising transparent film or an LCD unit.

FIG. 2 is an image taken by a digital camera of a light guiding panel 40 actually processed so as to satisfy the requirements described above of the recess profile. (In the light guiding panel 40 of FIG. 2, the part on which recesses are not formed is transparent and the part on which recesses are formed is translucent, but it should be considered that the actual shape of the light guiding panel 40 is not expressed fully because a blue paper is placed below the panel when the photo was taken.) Like the panel shown in FIG. 1, the light guiding panel 40 of FIG. 2 has fluorescent lamps, which are optical sources, installed at both the right-hand side and left-hand side. In order to find the characteristics of the profile of the recesses formed on the bottom surface of the actual light guiding panel 40, the inventor took seven samples (42a through 42g) of an appropriate size, at each predetermined interval along a straight line extended from arrow A in the direction from the center of the light guiding panel to the left hand side, and measured the surface state of the bottom surface by a variety of methods.

First, the surface of each sample was photographed by a scanning electron microscope (SEM) and FIGS. 3a through 3g correspond to the seven samples (42a through 42g), respectively. In these photos, recesses are seen bright and the dark parts indicate a part on which recesses are not formed. As seen in these photos, the density and size of recesses gradually decrease in the direction from 3a to 3g, that is, in the direction from the center part of the light guiding panel 40 to the left-hand side.

For more precise observation, the 3-dimensional surface shape of a predetermined part of each of the seven samples was photographed using interference of light and the results are shown in FIGS. 4a through 4g. With these figures, it can be confirmed that in addition to the density and size of the recesses, the depth of the recesses also gradually increases in the direction from the left-hand side to the center of the light guiding panel.

Data obtained by measuring surface illumination of an 8 mm interval of each of the seven samples are shown in FIGS. 5a through 5g. For the entire measured interval of each sample, the arithmetical mean derivation of the profile, Ra, and the maximum height of the profile, Ry, are shown in the following table 1:

TABLE 1

|    | Sample 1 | Sample 2 | Sample 3 | Sample 4 | Sample 5 | Sample 6 | Sample 7 |
|----|----------|----------|----------|----------|----------|----------|----------|
| Ra | 0.18     | 0.15     | 0.10     | 0.07     | 0.04     | 0.03     | 0.01     |
| Ry | 2.73     | 2.52     | 1.90     | 1.55     | 0.85     | 0.91     | 0.54     |

What can be seen from these data is that the Ra value of the arithmetical mean derivation gradually increases in the direction from the left-hand side to the center of the light guiding panel 40, and this measuring result also corresponds to the changing pattern of the average depth of the recesses described above. The Ry value of the maximum height also gradually increases in the direction from the left-hand side to the center of the light guiding panel 40. Though the values of samples 5 and 6 are shown reversely, it can be regarded as an exception that may occur the characteristic of the sandblasting process. From the viewpoint of probability, it can be concluded that the values of Ra and Ry gradually increase as a distance from the optical source increases, which corresponds to the changing pattern of the average depth of the recesses described above.

Figure 6:
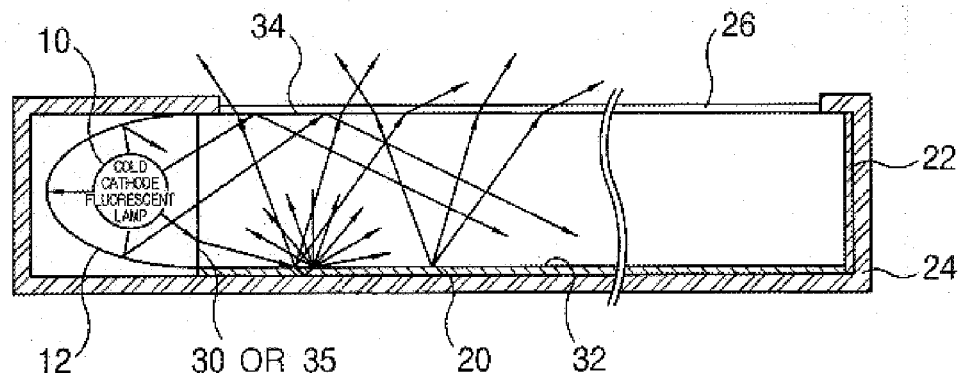
FIG. 6 is a schematic diagram of an embodiment of a backlight unit for an advertising film employing a light guiding panel processed according to the present invention.

FIG. 6 is a schematic diagram of an embodiment of a backlight unit for an advertising film employing a light guiding panel according to the present invention. In the backlight unit, a cold cathode fluorescent lamp 10 which emits light when power is supplied is arranged parallel to at least one side of the light guiding panel 30 or 35, and a reflection portion 12 which surrounds the fluorescent lamp 10 and reflects the light of the fluorescent lamp 10 into the light guiding panel 30 or 35 is arranged at the back of the fluorescent lamp 10. On the bottom surface 32 of the light guiding panel 30 or 35, minute recesses are formed as the pattern described above. On the bottom surface 32 and the side at which the fluorescent lamp 10 is not installed, a bottom reflection plate 20 and a side reflection plate 22, respectively, are attached so as to reflect the light emitting from the light guiding panel back to the inside of the light guiding panel. An advertising film 26 is attached directly on the front surface 24 of the light guiding panel 30 or 35. All these elements are assembled by a frame 24 into one body.

The Light emitted from the fluorescent lamp 10 is guided into the inside of the light guiding panel 30 or 35 through the side of the light guiding panel 30 or 35. The incident light in a variety of angles is emitted outside through the front surface 34 of the light guiding panel or is incident on the bottom surface by total reflection. The light incident on the bottom surface impinges on the recesses and according to the profile of the recesses is irregularly scattered or passes through the bottom surface, is reflected by the reflection plate 20, and then pass again through the bottom surface and is scattered. Through these very complicated reflection and scattering processes, the light is emitted to the front surface 34.

In the light guiding panel 30 or 35 according to the present invention, the light emitted passing through the front surface 34 is light that is diffused uniformly enough and the reflection pattern by the recesses is not seen at all with the naked eye such that a diffusion sheet (not shown) as in the prior art is not needed. Because of the fact that the light guiding panel does not use a diffusion sheet, the advertising film 26 is expressed more brightly and clearly such that a comparative advantage in advertising effects can be obtained compared to backlights using a diffusion sheet. An advertising film is made with a transparent film or a translucent print film having a light diffusion function. The light guiding panel of the present invention provides an excellent screen in either case. If the light guiding panel of the present invention is employed for a backlight unit for an LCD panel, uniformly diffused light is obtained already in the light guiding panel such that a separate diffusion sheet is not needed.

Figure 7:
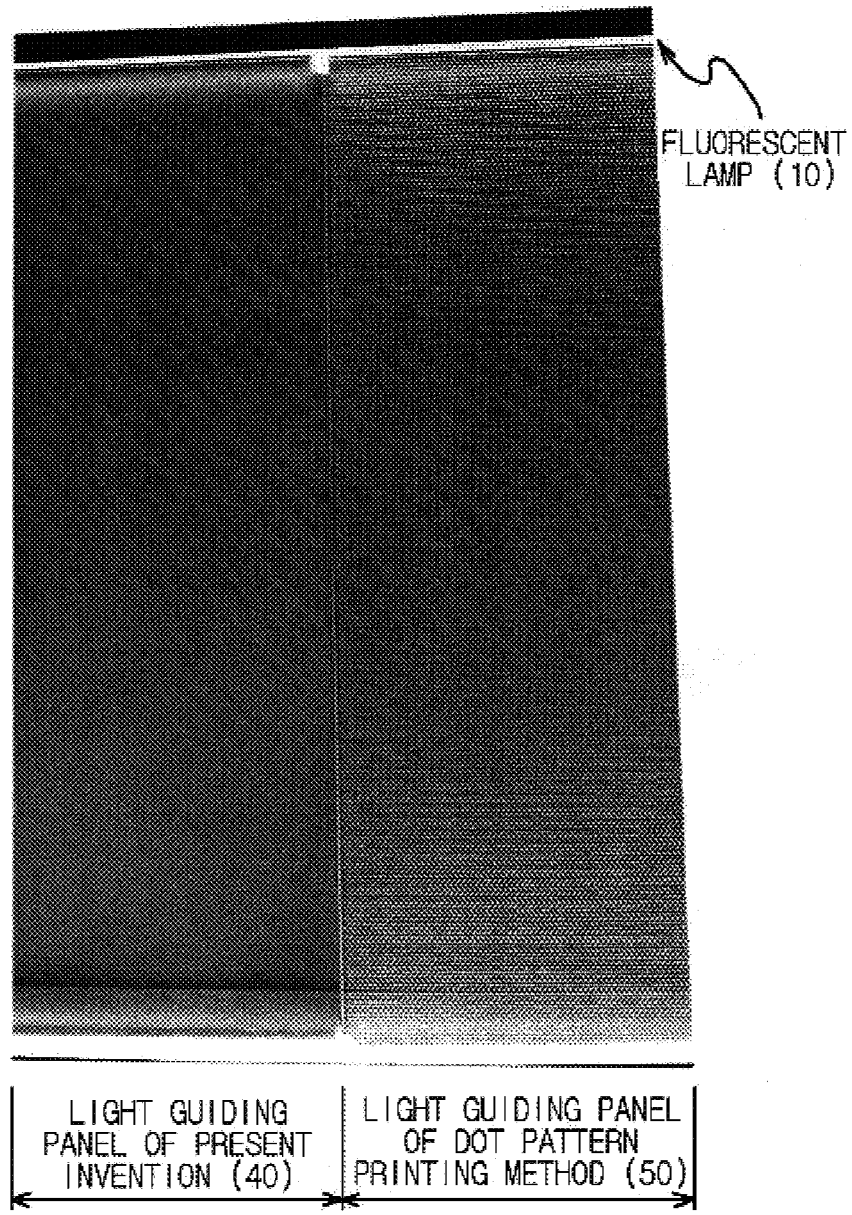
FIG. 7 is a photo taken by a digital camera using an identical fluorescent optical source, of a state where a light guiding panel according to the present invention and a light guiding panel manufactured by the prior art dot pattern printing method are arranged side by side.

FIG. 7 is a photo taken by a digital camera using an identical fluorescent lamp 10, of a state where a light guiding panel 40 according to the present invention and a light guiding panel 50 manufactured by the prior art dot pattern printing method are arranged side by side. In the area of the light guiding panel 50 by the prior art dot pattern printing method, the size of the dot pattern can be seen with the naked eye such that unless a diffusion sheet is used, the dot pattern is seen as is. Meanwhile, it is shown that even without a diffusion sheet to the front surface the light guiding panel 40 according to the present invention provides natural and uniformly diffused light.

Figure 8:
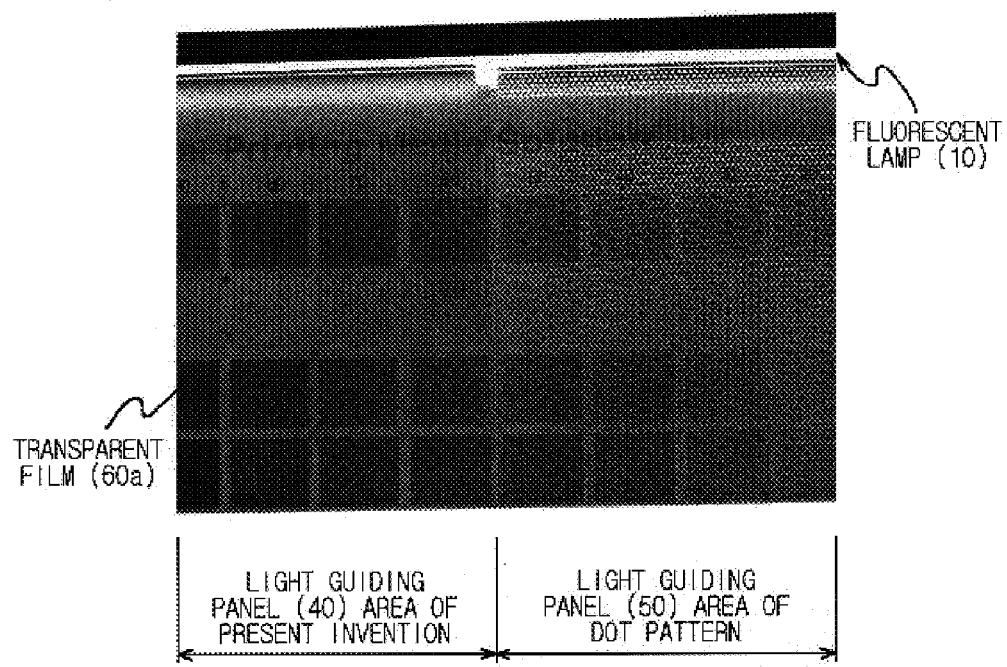
FIG. 8 is a photo taken by a digital camera of a state where a transparent film is placed on the two light guiding panels of FIG. 7.

FIG. 8 is a photo taken by a digital camera of a state where a transparent film 60a is placed on the two light guiding panels 40 and 50 of FIG. 7. As the photo shows, in the light guiding panel 50 by the prior art dot pattern printing method, even when the transparent film is placed on the panel 50, the dot pattern is seen as is such that the dot pattern can be seen with the naked eye. Accordingly, the panel 50 is not appropriate for a backlight of an advertising film made with a transparent film.

Figure 9:
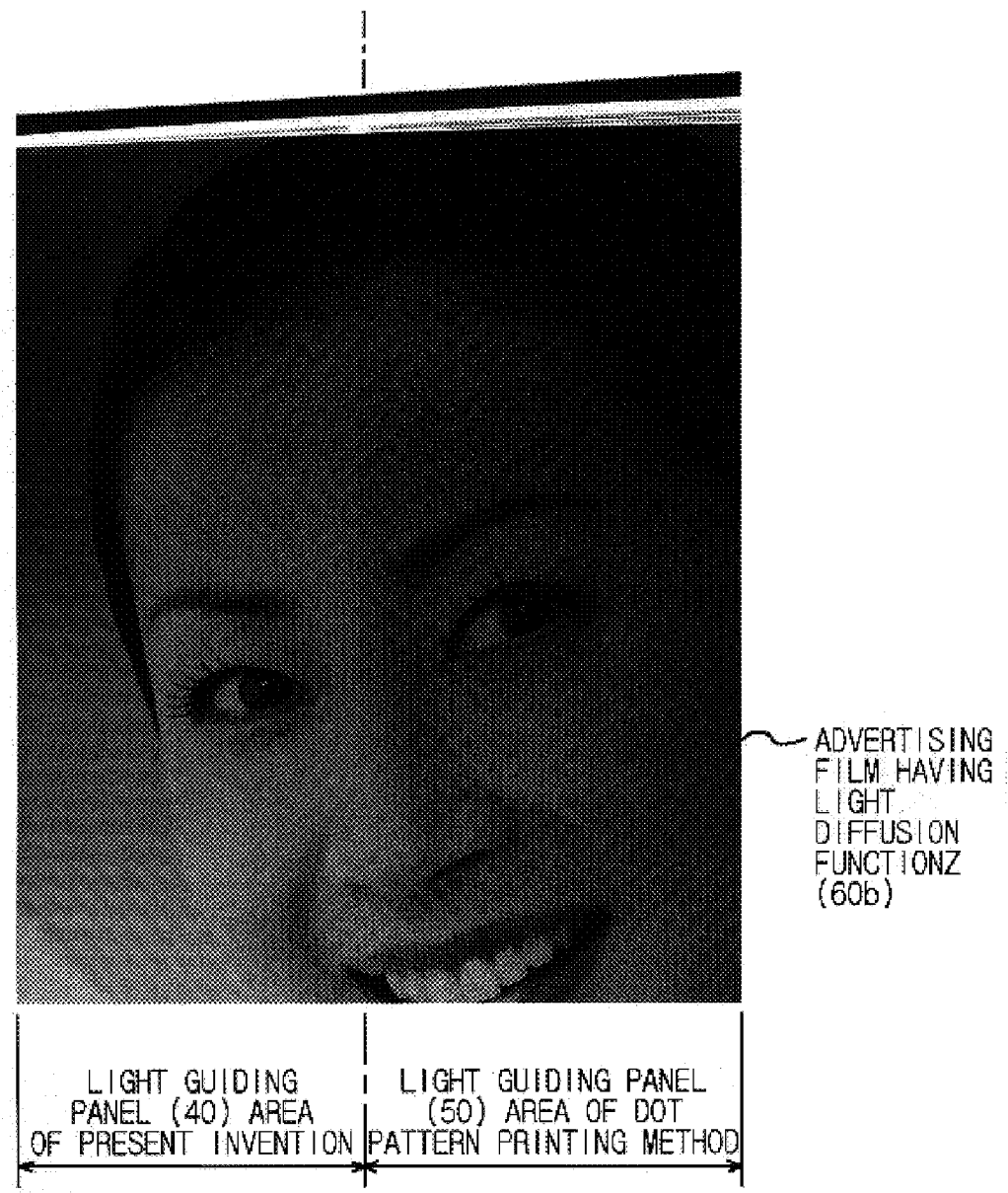
FIG. 9 is a photo taken by a digital camera of a state where a translucent advertising film combined with a film having a light diffusion function is placed on the two light guiding panels of FIG. 7.

FIG. 9 is a photo taken by a digital camera of a state where a translucent advertising film 60b combined with a film having a light diffusion function is placed on the two light guiding panels 40 and 50 of FIG. 7. The photo shows that the area of the light guiding panel 40 of the present invention is seen more brightly and clearly than that of the light guiding panel 50 by the dot pattern printing method, which indicates that the brightness of the light guiding panel 40 of the present invention is higher than that of the light guiding panel 50 by the dot pattern printing method. Since this is the case under identical conditions, if a diffusion sheet is added to the light guiding panel 50 by the dot pattern printing method, the brightness difference between the two panels 40 and 50 will increase further.

Figure 10:
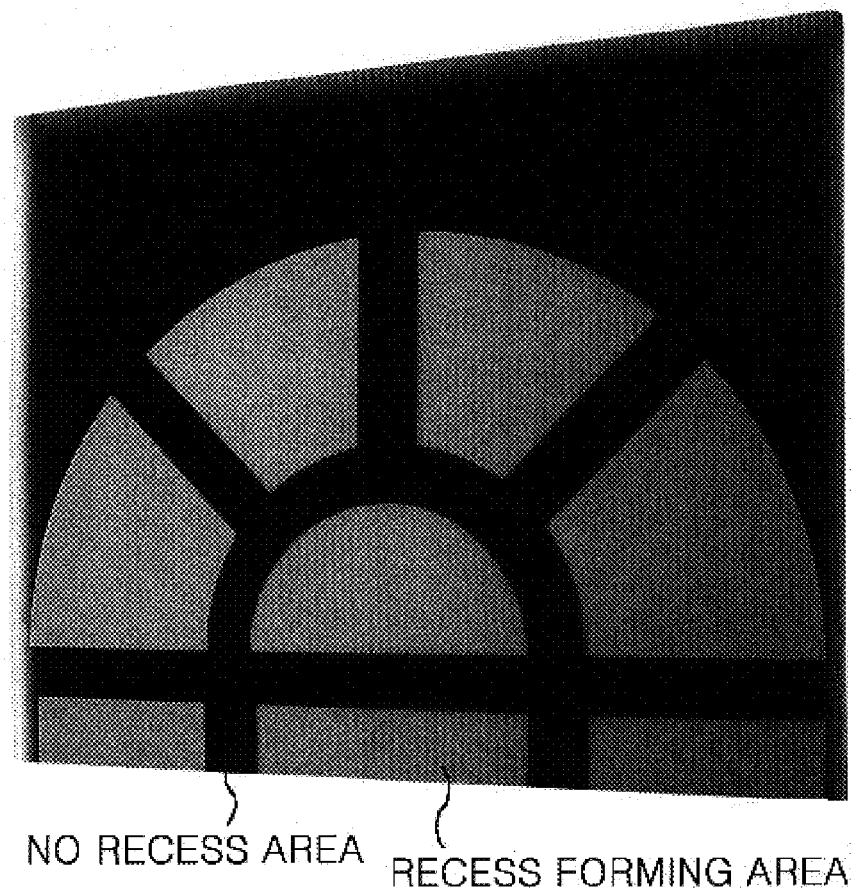
FIG. 10 is a photo taken by a digital camera of a light emitting state of a light guiding panel manufactured by clearly distinguishing areas where recesses are formed and areas where recesses are not formed.

The present inventor attempted to manufacture a light guiding panel by clearly distinguishing areas where recesses are formed and areas where recesses are not formed. FIG. 10 is a photo taken by a digital camera of a light emitting state of a light guiding panel manufactured in this manner. To one surface of an acryl resin substrate that is the raw material of the light guiding panel, tape is applied as a desired shape, and then the surface is sandblasted. As a result, a desired recess pattern can be obtained.

<Apparatus and Method for Processing a Light Guiding Panel>

The present inventor has developed some light guiding panel processing apparatuses specially designed for manufacturing the light guiding panel 30 or 35 of the present invention described above. The present inventor has already filed applications for the light guiding panel processing apparatus and a light guiding panel processing method using the same, with the Korean Intellectual Property Office (KIPO).

Figure 11:
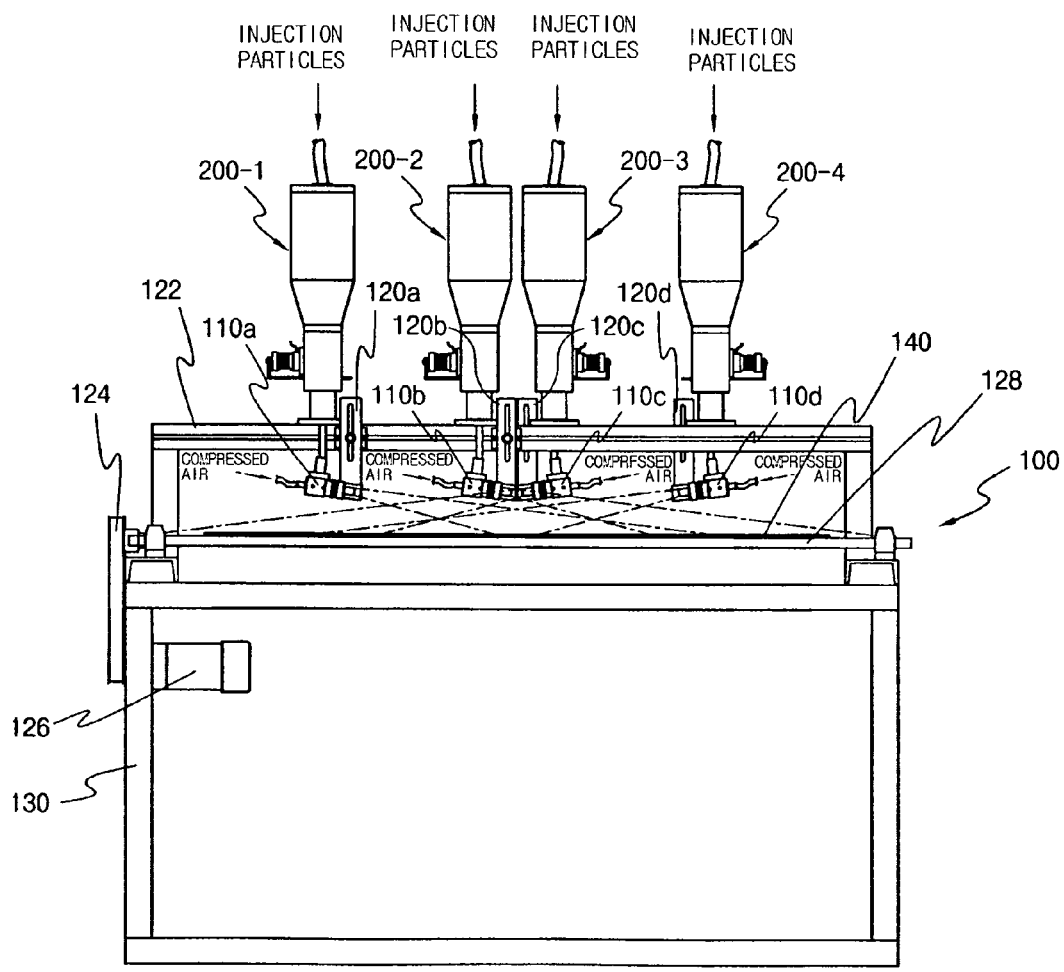
FIG. 11 is a front view of the structure of a light guiding panel manufacturing apparatus according to a first preferred embodiment of the present invention.
Figure 12:
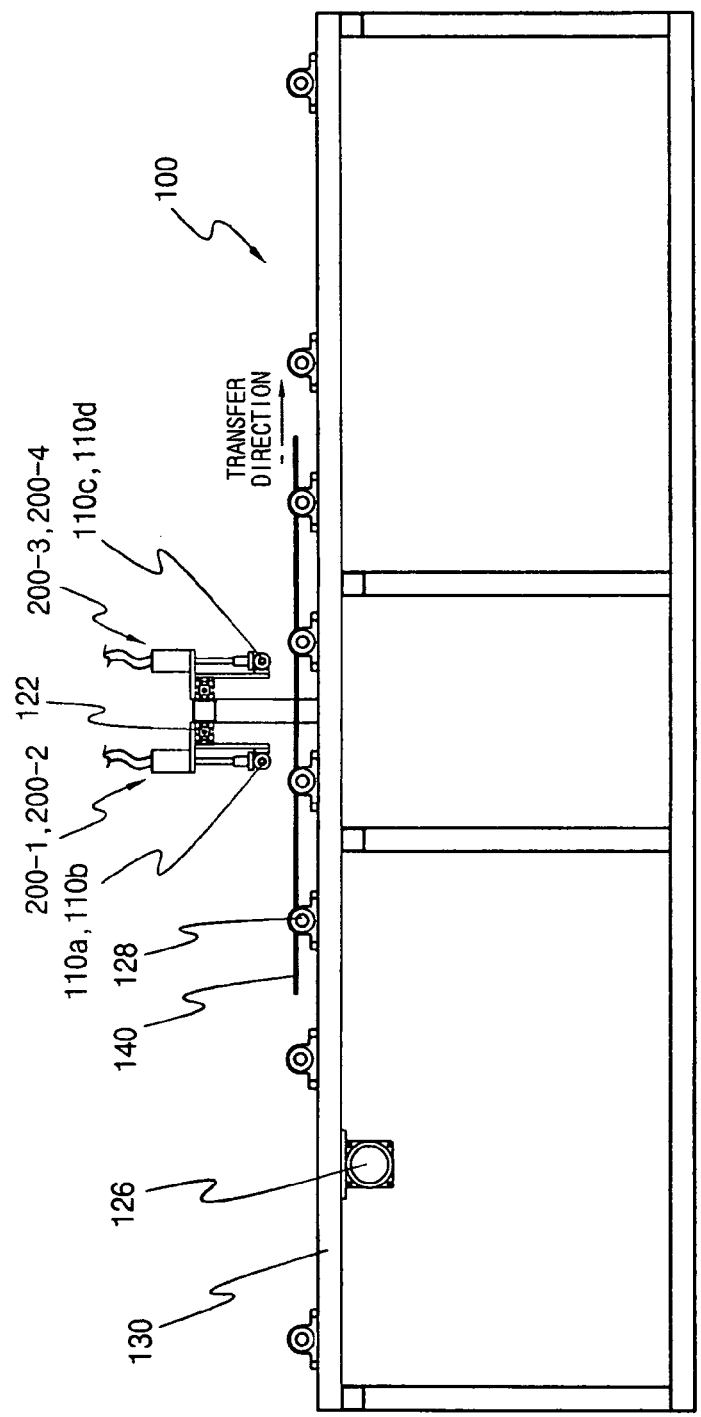
FIG. 12 is a side view of the apparatus shown in FIG. 11.
Figure 13:
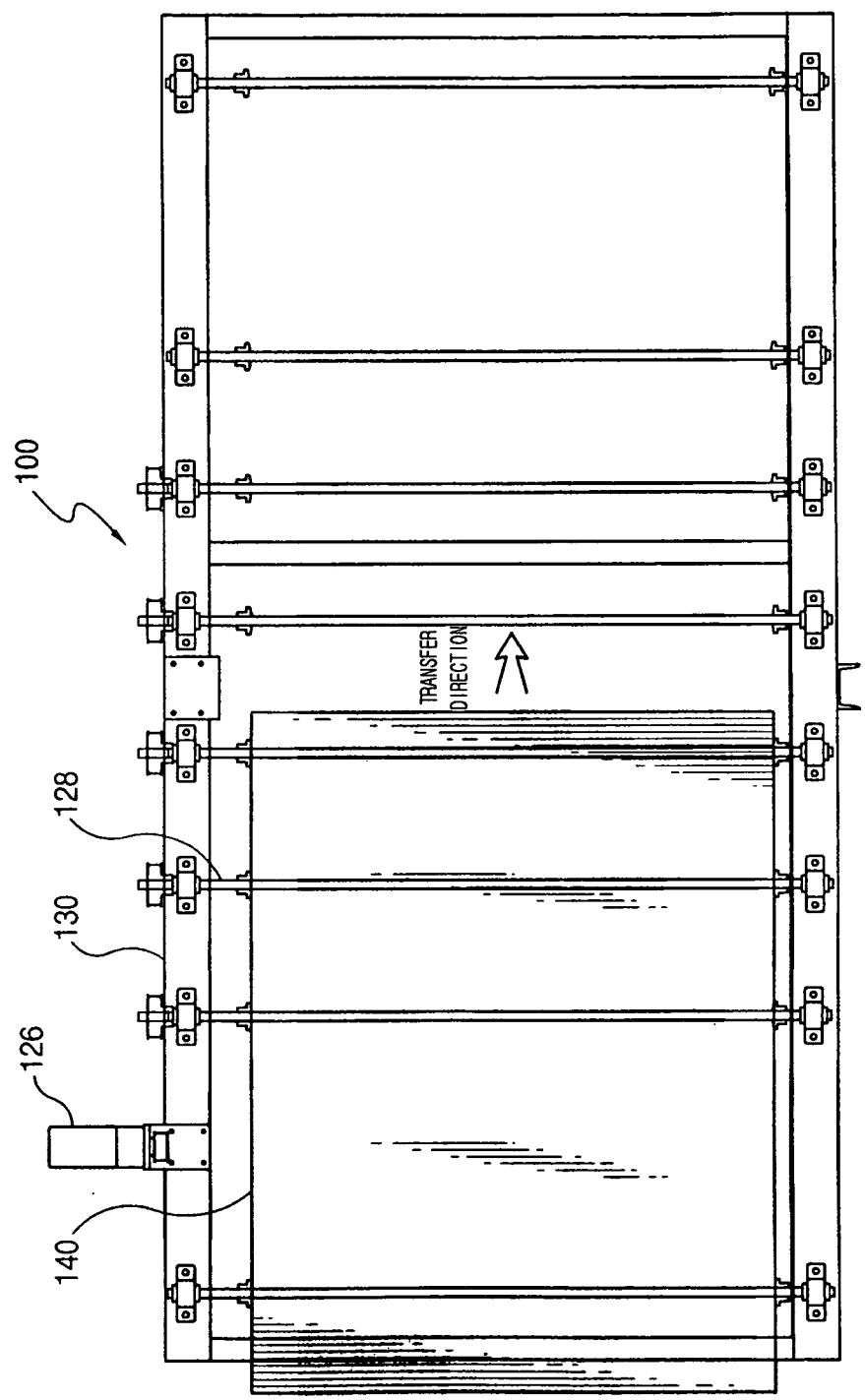
FIG. 13 is a plane view showing a state where a transparent substrate is placed on a transfer apparatus of the manufacturing apparatus shown in FIG. 11.

First, a first embodiment of the present invention will now be explained. The manufacturing apparatus of the first embodiment is shown in FIGS. 11 through 13. The manufacturing apparatus of the first embodiment employs a slantly and diffusively blasting method using injection nozzles, and broadly comprises a transfer apparatus 100 and one or more particle injection apparatuses 200-1 through 200-4. The number of particle injection apparatuses can be determined appropriately with respect to size of a transparent substrate 140.

The transfer apparatus 100 places the transparent substrate 140 on a transfer line formed with a plurality of transfer bars 128 and transfers the transparent substrate 140 at a predetermined speed. By employing the transfer apparatus 100, mass processing of light guiding panels is enabled. The transfer apparatus 100 can be constructed as a normal transfer system. More specifically, a motor 126 for supplying transfer power is installed at an appropriate location on the transfer apparatus body unit 130, and on the body unit 130, a plurality of transfer bars 128 are installed in parallel to form a transfer line. Combined to the axis of the motor 126 by a power transfer belt 124, each transfer bar 128 rotates by the rotation power of the motor 126 and the transparent substrate 140 placed on the transfer bars 128 is transferred along the transfer line. In addition to the belt method, a gear method may be employed for transferring the rotation power of the motor 126 to the transfer bars 128.

On the transfer apparatus 100, a horizontal position adjusting bar 122 and vertical position adjusting members 120a through 120d are installed and with these, one or more particle injection apparatuses 200-1 through 200-4 are installed on the transfer apparatus 100. The upper body of an injection nozzle unit 110a through 110d of each injection apparatus is mounted on the horizontal position adjusting bar 122 such that the position can be adjusted in the direction perpendicular to the transfer direction of the transparent substrate 140, and by the vertical position adjusting members 120a through 120d, the injection angle of each injection nozzle unit 110a through 110d can be adjusted up and down. Preferably, the transfer apparatus 100 is constructed so that the transfer speed of the transfer apparatus 100 can be controlled. For this, a driving unit (not shown) for driving the motor 126 may have a function for controlling the rotation speed of the motor 126, or a method by which the transfer speed can be reduced at a part for transferring the power of the motor 126 to the transfer bars 128 may be applied.

Figure 14:
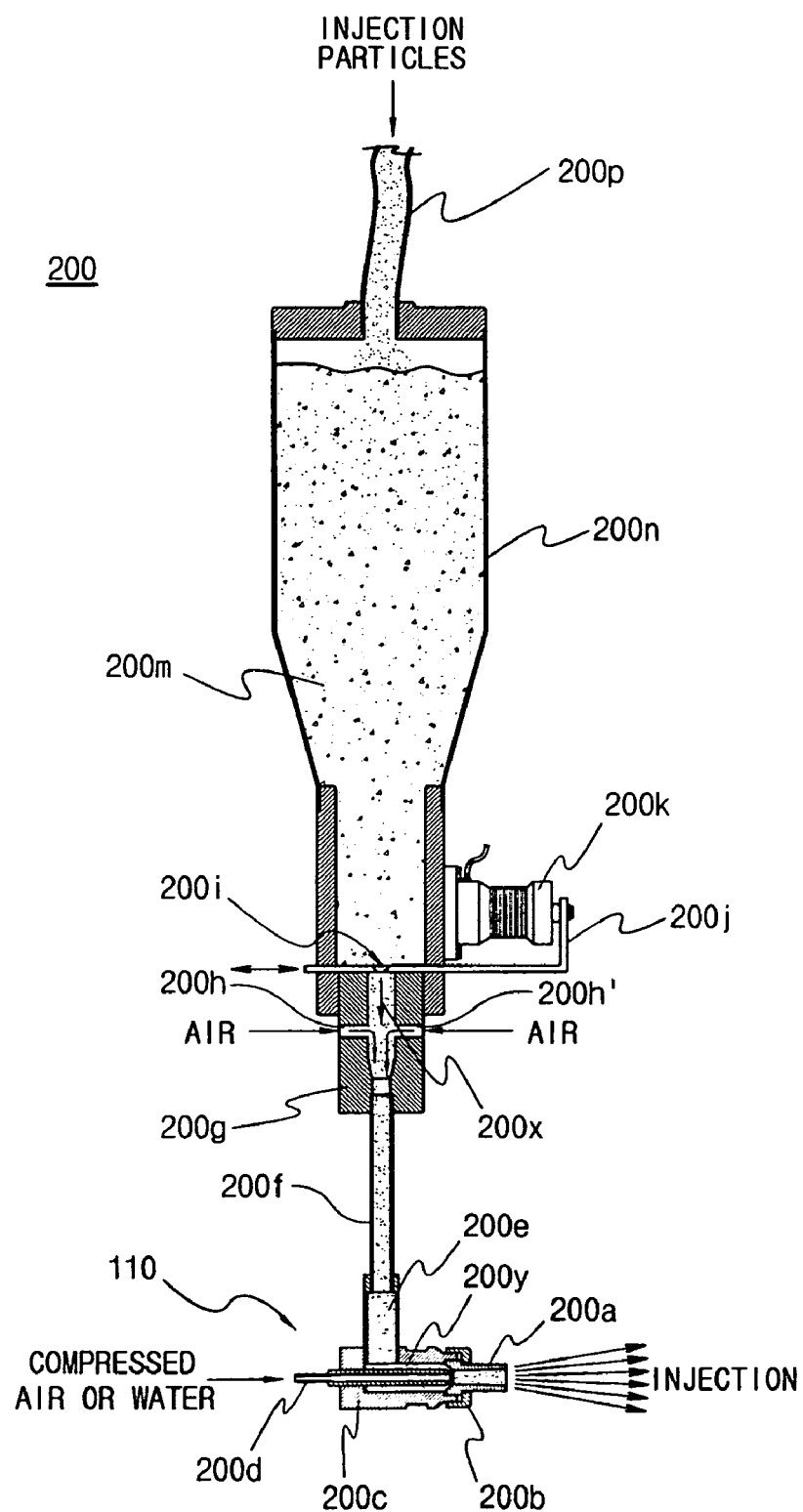
FIG. 14 is a diagram of an example of a particle injection apparatus for manufacturing a light guiding panel, which forms part of the light guiding panel manufacturing apparatus of the present invention.

FIG. 14 is a diagram of an example of a particle injection apparatus 200 used for manufacturing a light guiding panel according to the present invention. The particle injection apparatus 200 comprises a container 200n which stores injection particles 200m; a connection member 200g which is disposed between the bottom aperture of the container 200n and a particle supply pipe 200f and connects the container 200n and the particle supply pipe 200f; and an injection nozzle unit 100 which is connected to the connection member 200g and a pressure fluid supply unit (not shown) which supplies pressure fluid, such as compressed air or water, through the pressure fluid supply pipe 200d and the particle supply pipe 200f. Compared to the compressed air, the compressed water makes particles be injected more straightaway and after particles are injected on a substrate, less dust occurs.

The particle injection apparatus 200 further comprises an opening and shutting unit which is disposed between the top part of the connection member 200g and the bottom aperture of the container 200n, and controls so that only if the particle injection apparatus 200 is operating, the unit opens a path between the container 200n and the connection member 200g and else closes the path. The opening and shutting unit can comprise an opening and shutting plate 200j on which a hole 200i is formed on a predetermined location so that injection particles 200m can fall to the penetration hole 200x of the connection member 200g through the hole 200i; and a driving unit 200k which controls the opening or shutting the hole 200i by moving this opening and shutting plate 200j to the left or to the right.

Particularly, the connection member 200g has a structure in which the penetration hole 200x, which penetrates the center of the connection member 200g in the vertical direction and provides a path between the bottom aperture of the container 200n and the particle supply pipe 200f; and vent holes 200h and 200h', which connect and provide paths between predetermined locations of the sides of the connection member 200g and the penetration hole 200x, are formed.

Preferably, the particle supply pipe 200f is made with a flexible hose so that the injection direction of the injection nozzle 200a can be adjusted as desired.

According to the present embodiment, the injection nozzle unit 110 is installed such that the injection nozzle 200a is slanted to the light incident surface at a predetermined angle when it is seen from directly below the front surface of the transparent substrate 140.

With respect to the structure of the injection nozzle unit 110, one outlet and two entrances are formed on the injection nozzle body 200c and a cavity 200y is formed at the center. At the outlet of the body 200c, the injection nozzle 200a is mounted with an injection nozzle cover 200b as a medium. At a first entrance formed on the opposite side of the outlet of the body 200c, the pressure fluid supply pipe 200d is inserted and extended through the cavity 200y to the entrance of the injection nozzle 200a. To a second entrance formed on the side of the body 200c, a particle supply hole 200c, which connects and provides a path to the particle supply pipe 200f, is coupled.

When thus constructed particle injection apparatus 200 is operating, injection particles are provided through a connection pipe 200p, which is connected to a hopper (not shown) and the like, and are accumulated in the container 200n at first. Since the opening and shutting plate 200j is in an open state at this time, the minute particles of the container 200n are free-falling through the aperture 200i to the penetration hole 200x of the connection member 200g. Particularly, in the interval above the vent holes 200h and 200h' of the penetration hole 200x, injection particles are free-falling. By a low pressure atmosphere generated by high-speed injection of pressure fluid, such as compressed air or water, which is injected to the injection nozzle 200a through the pressure fluid supply pipe 200d, the free-fallen injection particles are forcibly pulled into the cavity 200y through the particle supply pipe 200f and the particle supply hole 200e, and mixed with the pressure fluid and then injected to the outside through the injection nozzle 200a.

Particularly, the particle injection apparatus 200 of the present invention can always maintain a constant amount of injecting particles with respect to time, and the amount of injecting particles in a unit time can be adjusted by the size of the aperture 200i, which are the comparative advantages of the injection apparatus 200 of the present invention over the conventional injection apparatuses. The reason why a constant amount of particles injected through the injection nozzle 200a is always maintained with respect to time is that when injection particles are flowing into the penetration hole 200x of the connection member 200g, injection particles are free-falling in the vertical direction just like the principle of an hourglass. The reason why the injection particles can free-fall is because there are vent holes 200h and 200h' formed on the connection member 200g.

Since minute particles have not so good fluidity due to the characteristic of the minute particles, an injection apparatus using a vacuum inhalation method based on Bernoulli's theorem which is a general injection method has been widely used in the prior art. That is, if a structure for inflow of external air preventing generation of high vacuum is not provided on the path for supplying injection particles, when pressure fluid is injected through the injection nozzle 200a at a high speed, a low pressure atmosphere, that is, high vacuum, is generated. In addition to the gravity of the earth, due to the pressure difference generated by this high vacuum, a power forcibly inhaling the injection particles of the container 200n into the penetration hole 200x of the connection member 200g through the aperture 200i becomes stronger. This forcible inhalation power applies to the entire supply path from the aperture 200i to the injection nozzle 200a. Then, when proceeding along the supply path, the forcibly inhaled particles strike against the wall or collide with other neighboring particles such that the speed changes due to the frictions. Particularly, due to the reason that the amount of pressure fluid supply provided through the pressure fluid supply pipe 200d changes with respect to time, the density in the injection nozzle 200a frequently changes, and the density change causes changes in the pressure of the supply path such that the amount of the minute particles forcibly inhaled from the aperture 200i becomes uneven. Like this, interactions continue. As a result, the amount of minute particles injected from the injection nozzle 200a or the injection speed become uneven and accordingly it is difficult to form recesses as a gradation pattern on the surface of the transparent substrate 140.

However, as in the present invention, if vent holes 200h and 200h' connected to the supply path of particles are formed on the connection member 200g, even when a low pressure atmosphere is generated by the high speed injection of pressure fluid, air is continuously supplied and complemented from the outside through the vent holes 200h and 200h'. Accordingly, the low pressure atmosphere is formed only to the part below the vent holes 200h and 200h' of the penetration hole 200x, the pressure of the atmosphere is also higher than in the conventional method, and particularly, in the interval (marked by an arrow in the figure) above the vent holes 200h and 200h' of the penetration hole 200x, no low pressure atmosphere is generated at all. Therefore, forcible inhalation of particles by the pressure difference does not occur and only free-fall by gravity occurs. After passing the vent holes 200h and 200h', the free-fallen particles are forcibly pulled in a moment and injected through the injection nozzle 200a.

If this free-falling interval is established, injection particles are free-falling just like the principle of an hourglass such that a predetermined amount of particles with respect to the lapse of time can be provided to the particle supply pipe 200f. Accordingly, even though there is momentarily a difference of the amount of minute particles injected from the injection nozzle 200a due to the fact that the amount of pressure fluid provided through the pressure fluid supply pipe 200d changes with respect to time, the constant amount of minute particles for a time with a predetermined length can always be maintained. Furthermore, by adjusting the size of the aperture 200i, the amount of injection can be accurately adjusted. Even when a plurality of injection nozzles are installed, it is easy to precisely control the injection amount of each injection nozzle, and in addition, controllability and time uniformity of the injection amount can improve the uniformity and reproducibility of product quality.

Again referring to FIGS. 11 through 13, it is preferable that the injection nozzle unit 110a through 110d is arranged so that the injection direction is roughly perpendicular to the transfer direction and is slanted to the light incident surface at a predetermined angle when it is seen from the directly below the front surface of the transparent substrate 140.

As material for processing a light guiding panel, a transparent resin substrate 140, for example, an acryl substrate, can be used and the present invention can be widely applied without a particular limitation of the material for a substrate.

As injection particles, particles of aluminum carbide, silicon carbide, zirconia, or diamond can be used, but the examples of usable particles are not limited to these, and any particle whose solidity is higher than that of the material for the transparent substrate such that forming recesses can be performed efficiently can be used without limitations. It is preferable that injection particles with high uniformity of the shape or size are used. One of the most appropriate particles satisfying these requirements is diamond particle. Diamond particles have good fluidity such that supply through free-fall is smoothly performed, and have high uniformity of the size and a low degree of dust generation due to collision of the particles during a process for supply to an injection nozzle. Preferably, particles of size #100~#200 are used.

Forming recesses on the surface of the transparent substrate by using the apparatus described above will now be explained. First, the transparent substrate is cut into a desired size and placed on the transfer line of the transfer apparatus 100. By operating the transfer apparatus 100, the transparent substrate 140 is transferred at a predetermined speed and at the same time by operating the injection apparatus 200, particles are injected slantly on the transparent substrate 140. At this time, in order to reduce the so-called H-beam effect in which an edge area of a light guiding panel becomes relatively darker, it can be considered that when particles are injected on an edge part of the transparent substrate 140, the transfer speed is controlled to become relatively lower so that more recesses are formed on the edge area. After the process for forming recesses is finished, the substrate is transferred to next processes of cleansing, drying, and inspection.

Figure 15A:
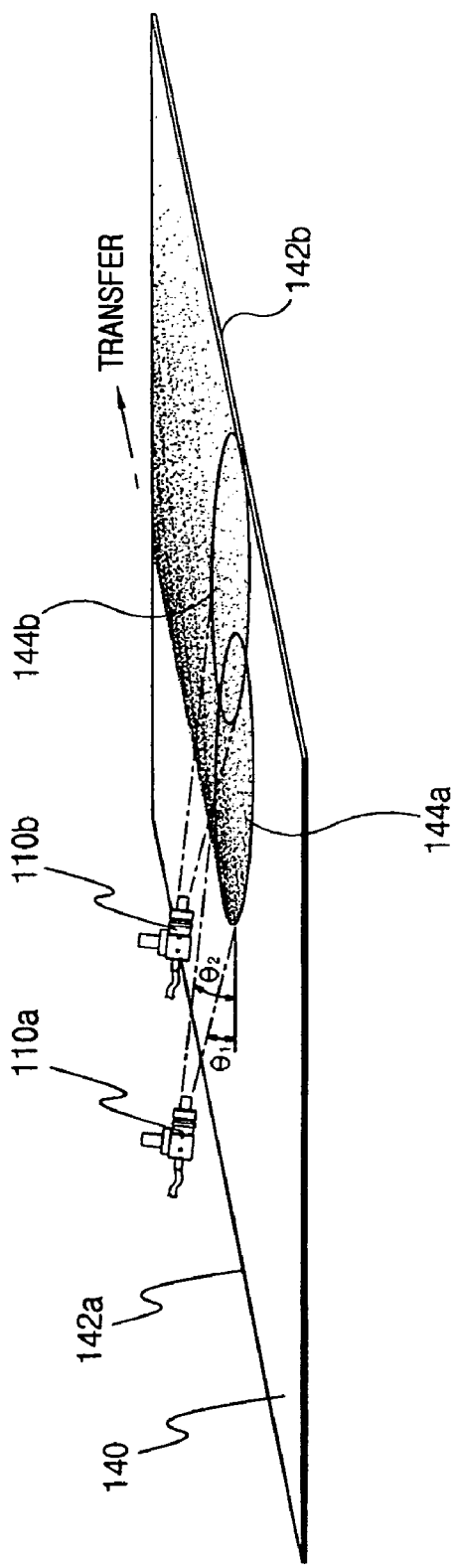
FIGS. 15a and 15b are diagrams for explaining a process for processing the light guiding panel shown in FIG. 1a in which two side surfaces facing each other are surfaces on which light is incident.
Figure 15B:
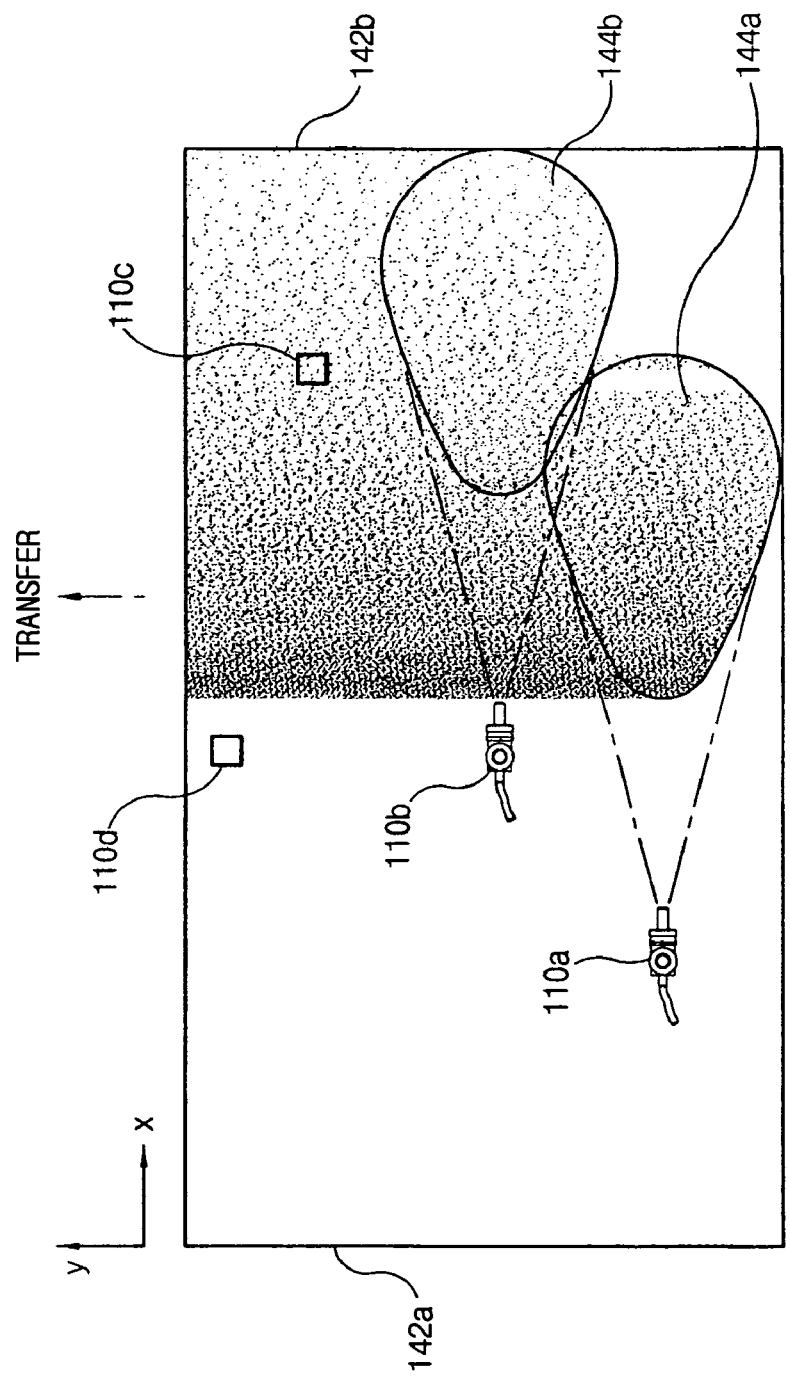

FIGS. 15a and 15b show a process for forming recesses to manufacture a light guiding panel in which light incident surfaces are two surfaces 142a and 142b facing each other as the light guiding panel 30 shown in FIG. 1a. For convenience of description, in FIG. 15a, it is shown only that two injection nozzles 110a and 110b inject particles on the right-hand half part of the transparent substrate 140 in the transfer direction. However, other two injection nozzles 110c and 110d actually form recesses on the remaining left-hand half part of the transparent substrate 140 as shown in FIG. 15b. Though the figures show a case where 4 injection nozzles are employed, it is just an example and the number of injection nozzles employed can be determined more or less with respect to size of a transparent substrate to be processed.

The first injection nozzle 110a and the second injection nozzle 110b are located on a diagonal line of an x-y plane and their respective injection areas 144a and 144b are a little overlapping and cover the right-hand half part. The arrangement of the third and fourth injection nozzles 110c and 110d covering the left-hand half part is made to correspond to the arrangement of the first and second injection nozzles 110a and 110b. By thus arranging the injection nozzles 110a and 110b, as one method for increasing the number of recesses as a distance from either of the light incident surfaces 142a and 142b increases, it is preferable that the number of particles injected from each of the first and third injection nozzles 110a and 110c in a unit time is greater than that of particles injected from each of the second and fourth injection nozzles 110b and 110d in a unit time. As another method, the injection pressures of the first and third injection nozzles 110a and 110c may be made to be higher than the injection pressures of the second and fourth injection nozzles 110b and 110d. In addition, the two methods adjusting the injection amount of particles and the injection pressure of the injection nozzles may be combined and then applied.

Each injection nozzle 110a through 110d is installed such that the injection direction is roughly perpendicular to the transfer direction and is slanted to the surface of the transparent surface 140, as described above. If the injection direction is thus slanted, an angle at which minute particles are incident on the transparent substrate 140 decreases as the distance from a minute particle on the transparent substrate 140 to the injection nozzle increases. That is, since $(\pi/2)-\theta_1 > (\pi/2)-\theta_2$, the impact by the minute particle on the transparent substrate 140 also decreases as much. As a result, the size and depth of a recess formed on the surface of the transparent substrate 140 by the injection minute particle also decrease as a distance from the injection nozzle 200a increases. In addition, since particles injected from the injection nozzle are wide spreading while proceeding, the number of recesses on a unit area of the transparent substrate 140, that is, the density of recesses, decreases as a distance from the injection nozzle increases. Also, as a distance from the injection nozzle decreases, the probability that particles collide with each other on an identical location rises. Accordingly, the size of recesses increase, the contours merged with neighboring recesses become more complicated, and the complexity of the surface profile of recesses increases. Therefore, if recesses are formed by this process, the recess profile of the bottom surface of the light guiding panel described above can be obtained.

Figure 16A:
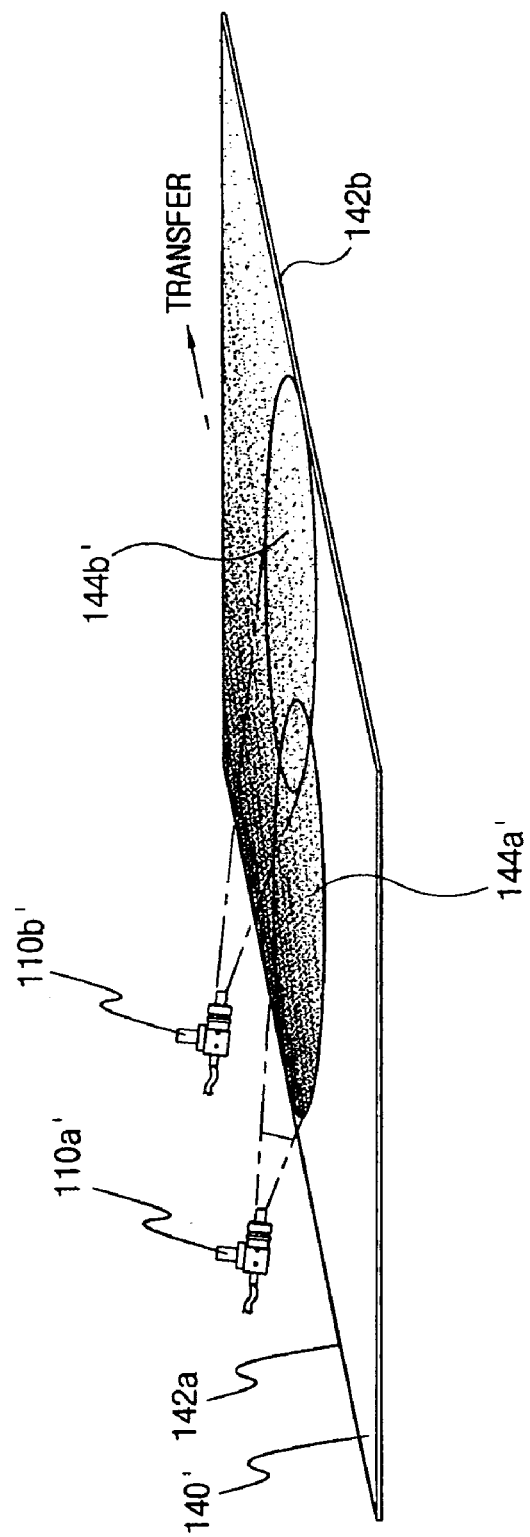
FIGS. 16a through 16c are diagrams for explaining a process for processing the light guiding panel shown in FIG. 1b in which one side surface is a surface on which light is incident.
Figure 16B:
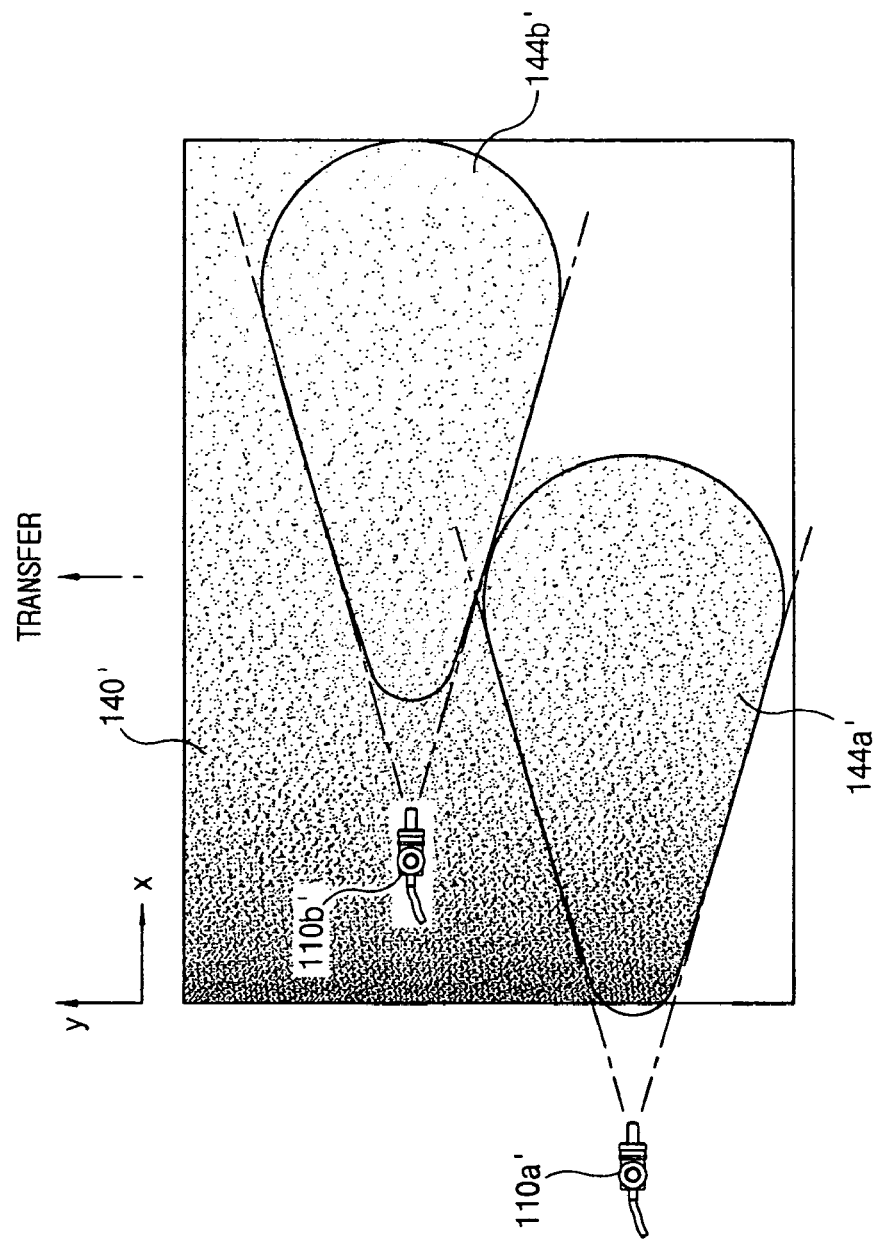
Figure 16C:
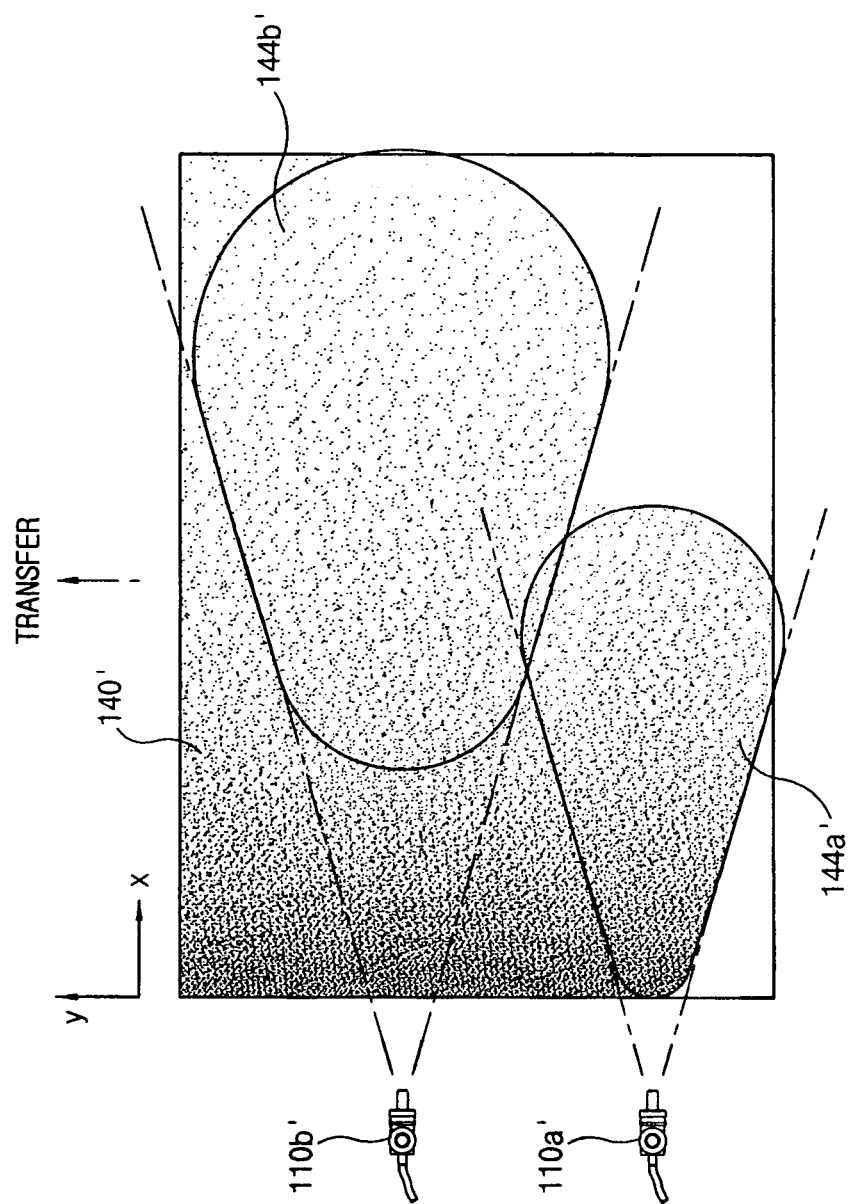

FIGS. 16a through 16c show a process for forming recesses to manufacture a light guiding panel having one light incident surface 142b as shown in FIG. 1b, by using two injection nozzles 110a' and 110b'. If the size of the transparent substrate 140' is small, just one injection nozzle will be enough. The two injection nozzles 110a' and 110b' can be arranged in the diagonal direction on the x-y plane as in FIG. 16b, or in a row in the y-axis direction as in FIG. 16c. When the nozzles are arranged as in FIG. 16c, in order to obtain a gradation pattern of recesses, it is preferable that the injection pressure and/or amount of the second injection nozzle 110b' is less than those of the first injection nozzle 110a'. When the nozzles are arranged as in FIG. 16c, identical injection pressure and amount can be applied to both of the two injection nozzles 110a' and 110b' and if appropriately adjusting the injection angle is considered, it will be enough.

Figure 17:
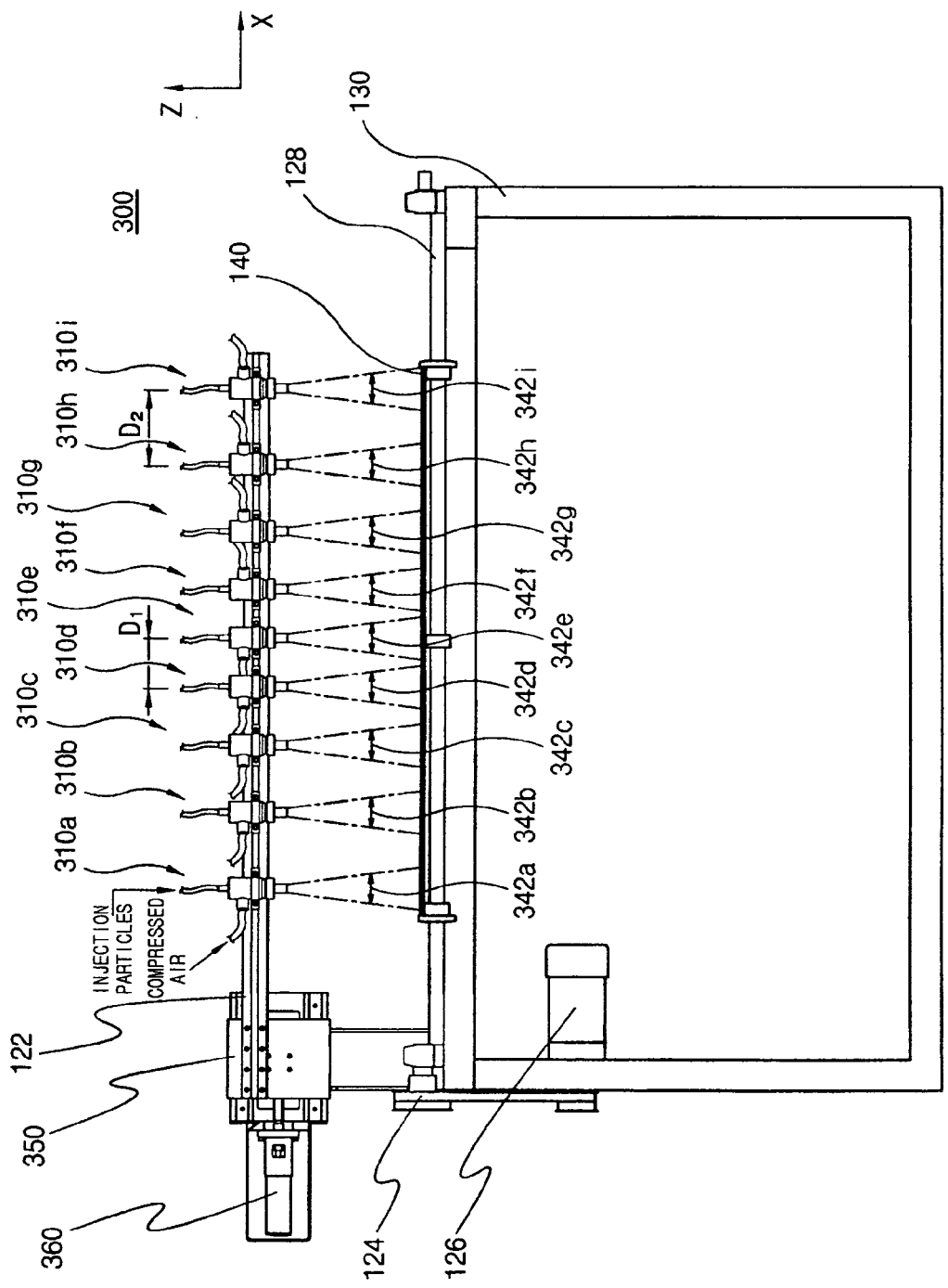
FIG. 17 is a front view of the structure of a light guiding panel manufacturing apparatus according to a second preferred embodiment of the present invention.

Next, a second preferred embodiment of a manufacturing apparatus and process of the present invention will now be explained. FIG. 17 is a diagram of a second preferred embodiment of the structure of a light guiding panel manufacturing apparatus according to the present invention. The second embodiment uses perpendicularly and diffusively blasting method using in-lined nozzles. When compared with the manufacturing apparatus shown in FIGS. 11 through 13 described above, this embodiment of the apparatus has no difference in the structure of the transfer apparatus 100 and has a basic difference in that the injection direction is not slanted to the surface of the transparent substrate 140 and is vertical.

A plurality of injection nozzles 310a through 310i are arranged in a row in the direction perpendicular to the transfer direction of the transfer line on the transfer bars 128. Each injection nozzle 310a through 310i is installed such that the injection is directed right below and is perpendicular to the surface of the transparent substrate 140. In addition, as a method for forming recesses such that the distribution and/or size (or depth) of recesses increase as a distance from the light incident surface increases, the injection nozzles are installed such that the interval between neighboring injection nozzles narrows as a distance from the light incident surface increases. FIG. 17 shows an example of manufacturing a light guiding panel in which both sides are light incident surfaces, and shows the case where the interval D2 of the injection nozzles 310h and 310i close to a side is greater than the interval D1 of the injection nozzles 310d and 310e at the center.

Thus, when arranging injection nozzles, different injection amounts and/or pressures of particles are applied. That is, in order to obtain the recess profile of a light guiding panel according to the present invention described above, injection nozzles are arranged such that the injection amount and/or pressure of particles of an injection nozzle covering a corresponding area gradually increase, as a distance from a side at which an optical source is installed increases. In order to obtain a desired recess profile, the method for appropriately adjusting an interval for arranging injection nozzles may be appropriately used further.

As shown in the apparatus of FIG. 17, a blank area on which particles are not injected may occur between neighboring injection nozzles. To reduce the blank areas and generate a gradation pattern of uniform recesses, it is needed to make an injection nozzle swing in the direction perpendicular to the transfer direction when particles are injected. For this, injection nozzles are attached in a row to the horizontal position adjusting bar 122 and the horizontal position adjusting bar 122 is fixed to an LM guide 350, and a servo motor 360 is coupled to the LM guide 350. With this construction, the servo motor 360 swings the LM guide 350 in the direction (linking the left-hand side and the right-hand side in the figure) perpendicular to the transfer direction of the transparent substrate 140 at a predetermined interval. Accordingly, the injection nozzles can inject particles uniformly on the entire surface of the transparent substrate 140 without a blank.

Figure 18:
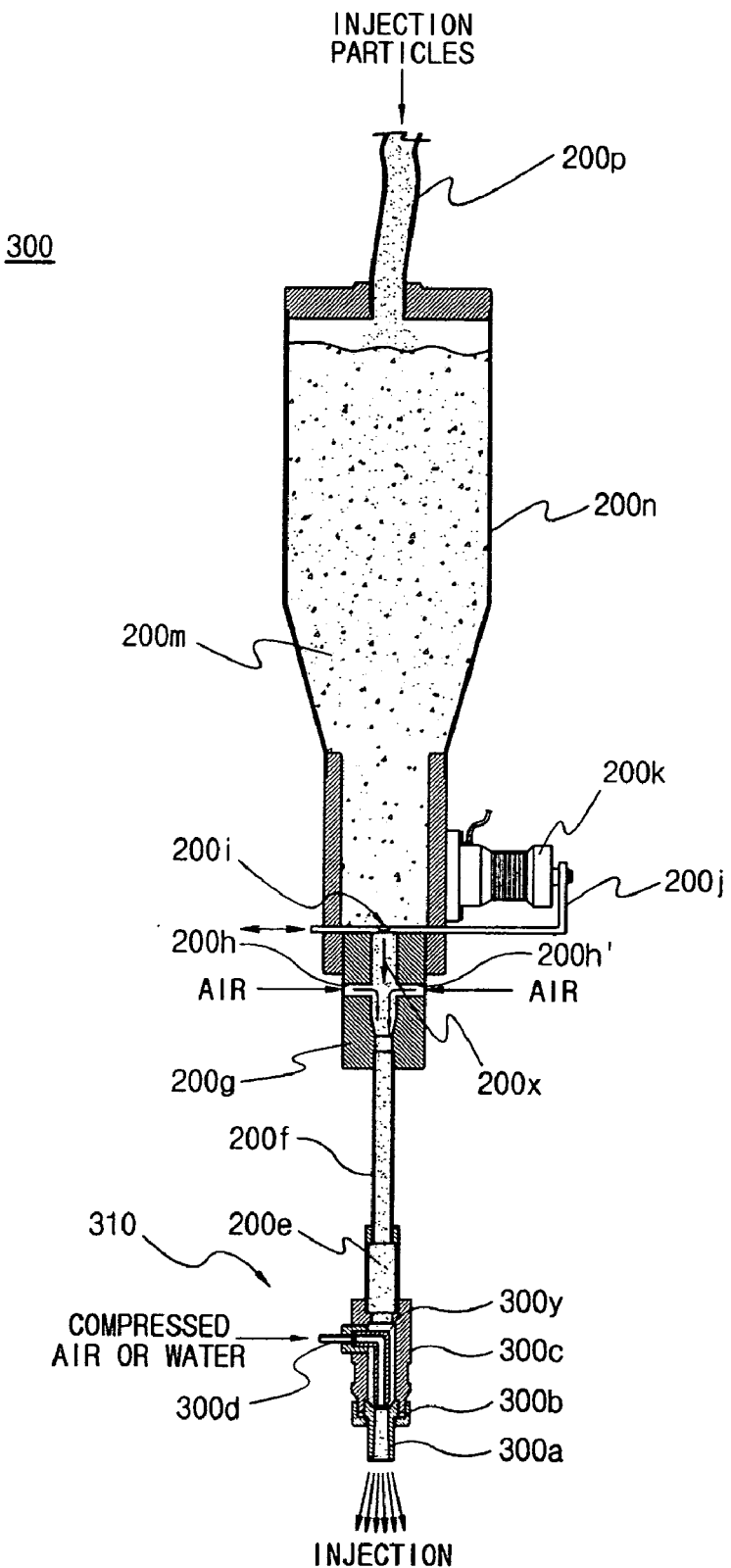
FIG. 18 is a modified example of a particle injection apparatus for manufacturing a light guiding panel, the apparatus applied to the second preferred embodiment.

FIG. 18 shows the structure of a particle injection apparatus 300 that can be applied to this vertical injection method. The particle injection apparatus 300 is different from that 200 of FIG. 18 in that the injection nozzle 310 is directed right below. More specifically, the particle supply hole 200*e* is connected to the back of the injection nozzle body 300*c* and the pressure fluid supply hole 300*d* is bent by about 90 degrees and connected to the side of the injection nozzle body 300*c*. Except this difference, other characteristics, for example, the fact that particles are supplied to the injection nozzle 310 through free-fall, are the same as those of the particle injection apparatus of FIG. 14.

Meanwhile, with an acryl resin substrate with a size of 309 mm×236 mm as the transparent substrate 140, the present inventor carried out the process for forming recesses by using the manufacturing apparatus of the slant injection method shown in FIGS. 11 through 14. The processing conditions of this process were applied as the following table 2:

TABLE 2

| | |
|---|---|
| Transfer speed of acryl substrate | 900 mm/min |
| Angle of injection nozzle | 7 degrees from the acryl substrate surface |
| Pressure of injection nozzle | 6 kg$_f$/cm$^2$ |
| Particles for injection | Diamond (#150: 80~150 μm) |
| Injection amount of injection particles | 0.4 l/min |

FIG. 19 shows photos, taken by using a microscope, of three areas (30*x*, 30*y*, 30*z*; See FIG. 5*a*) on the surface of the light guiding panel 30 obtained by processing the acryl substrate by this method. As the distribution photos of the three areas show, while the distribution of recesses is 54 recesses per 1 mm$^2$ in the area 35*x* which is close to the light incident surface 30*a*, the numbers gradually increase in the inner areas 35*y* and 35*z* with 120 and 180, respectively. Also, it can be confirmed that the size of recesses gradually increases and the depth of recesses also gradually increases as a distance from the light incident surface 30 increases.

Figure 20:
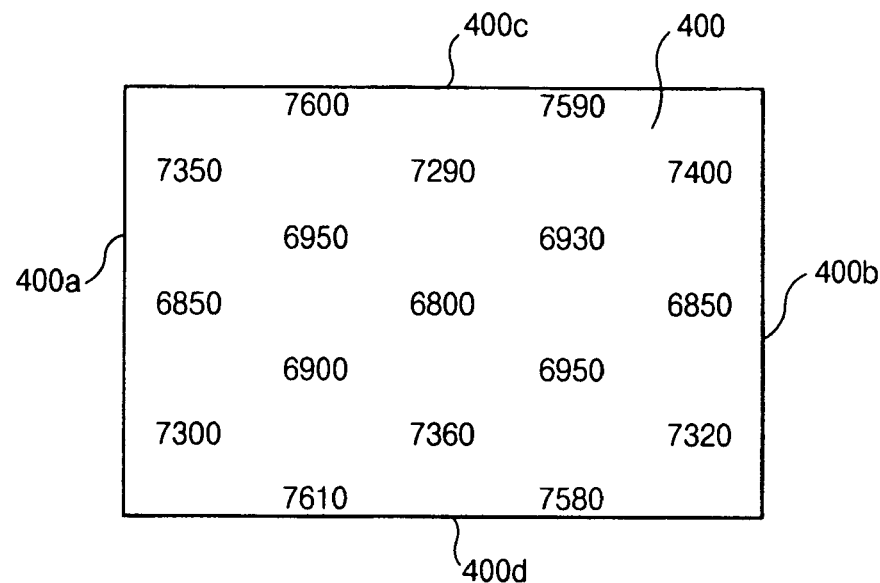
FIG. 20 is a diagram showing an illumination distribution measured when light is incident on both sides of a light guiding panel actually processed according to the present invention.

If light is incident on the light guiding panel manufactured thus, uniform optical brightness can be induced on the entire light guiding panel. FIG. 20 shows the result of measuring the illumination of the surface of the light guiding panel by making light incident on both light incident surfaces 400*a* and 400*b* of a light guiding panel manufactured through the process described above. The range of illumination was measured between maximum 7600 lux and minimum 6800 lux, and about 10% illumination deviation was observed.

Figure 21A:
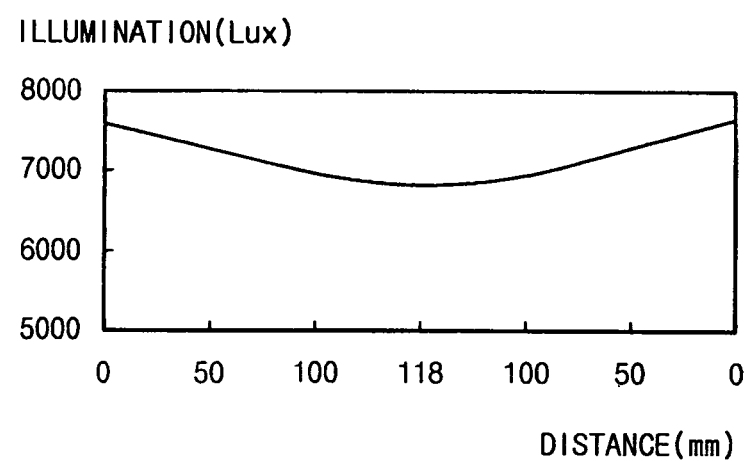
FIGS. 21a through 21d are graphs showing changes in illumination, the size of recesses, the depths of recesses, and the number of recesses, respectively, with respect to distance in a light guiding panel actually processed according to the present invention.
Figure 21B:
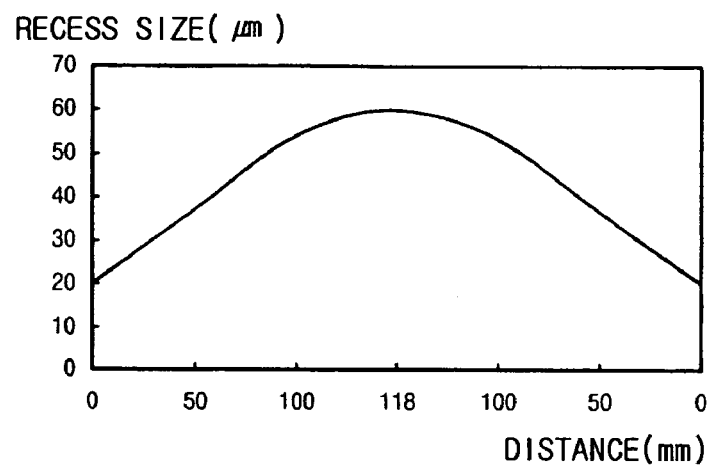
Figure 21C:
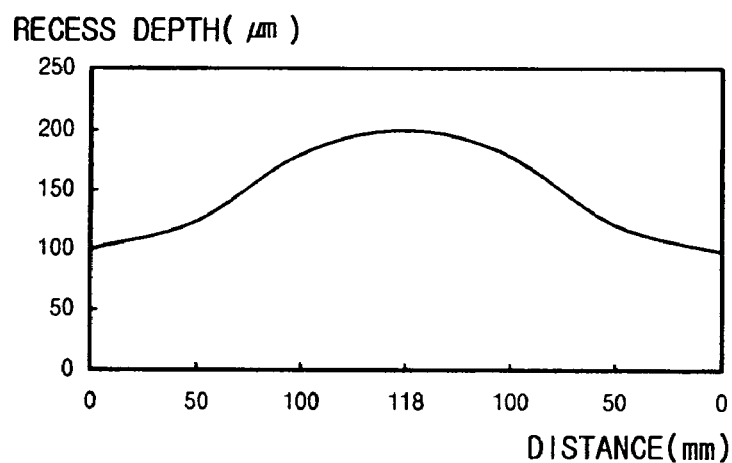
Figure 21D:
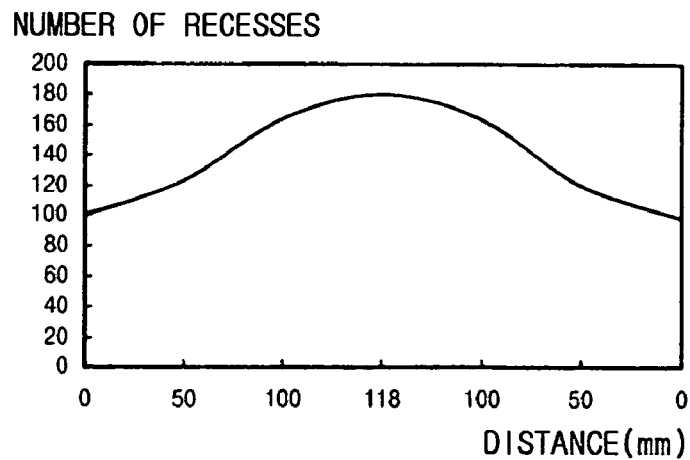

FIG. 21*a* shows the distribution of illumination with respect to distance from both light incident surfaces 400*a* and 400*b*. Though the center is seen a little dark, this degree of deviation is negligible. In addition, FIGS. 21*b* through 21*d* are graphs showing the size, depth, and number, respectively, of recesses with respect to distance from both light incident surfaces 400*a* and 400*b*. These graphs also confirm that the attributes of the recess profile, that is, the average size and average depth of the recesses, increase, as a distance from the light incident surfaces 400*a* and 400*b* increases, and the distribution density of the recesses also increases, as described above.

Though it is explained with a flat type light guiding panel as an example so far, the present invention is not limited by this type, and can also be applied to a wedge type light guiding panel.

Figure 22:
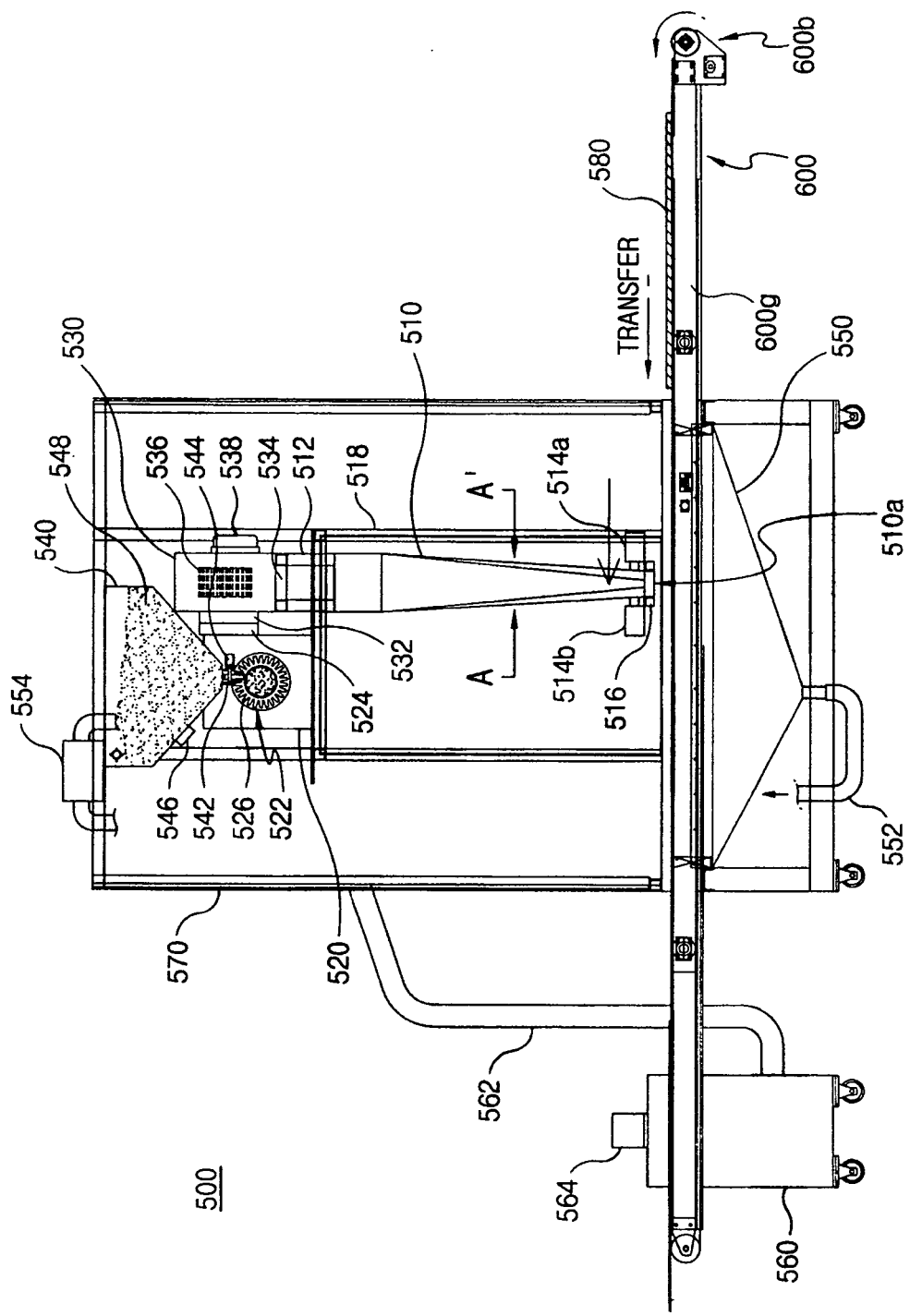
FIG. 22 is a side sectional view of the structure of a light guiding panel manufacturing apparatus according to a third preferred embodiment of the present invention.
Figure 23:
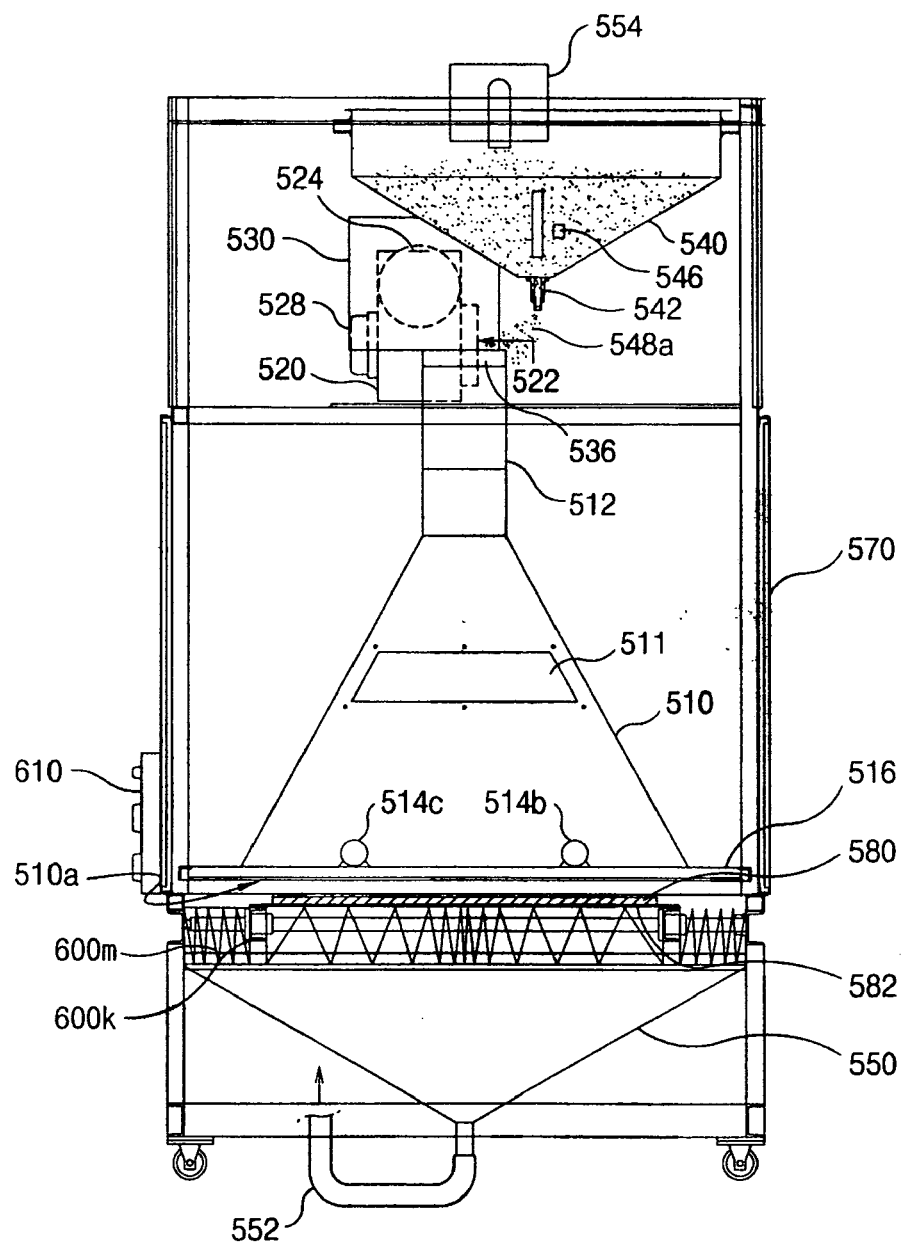
FIG. 23 is a front sectional view of the structure of a light guiding panel manufacturing apparatus according to the third preferred embodiment of the present invention.
Figure 24:
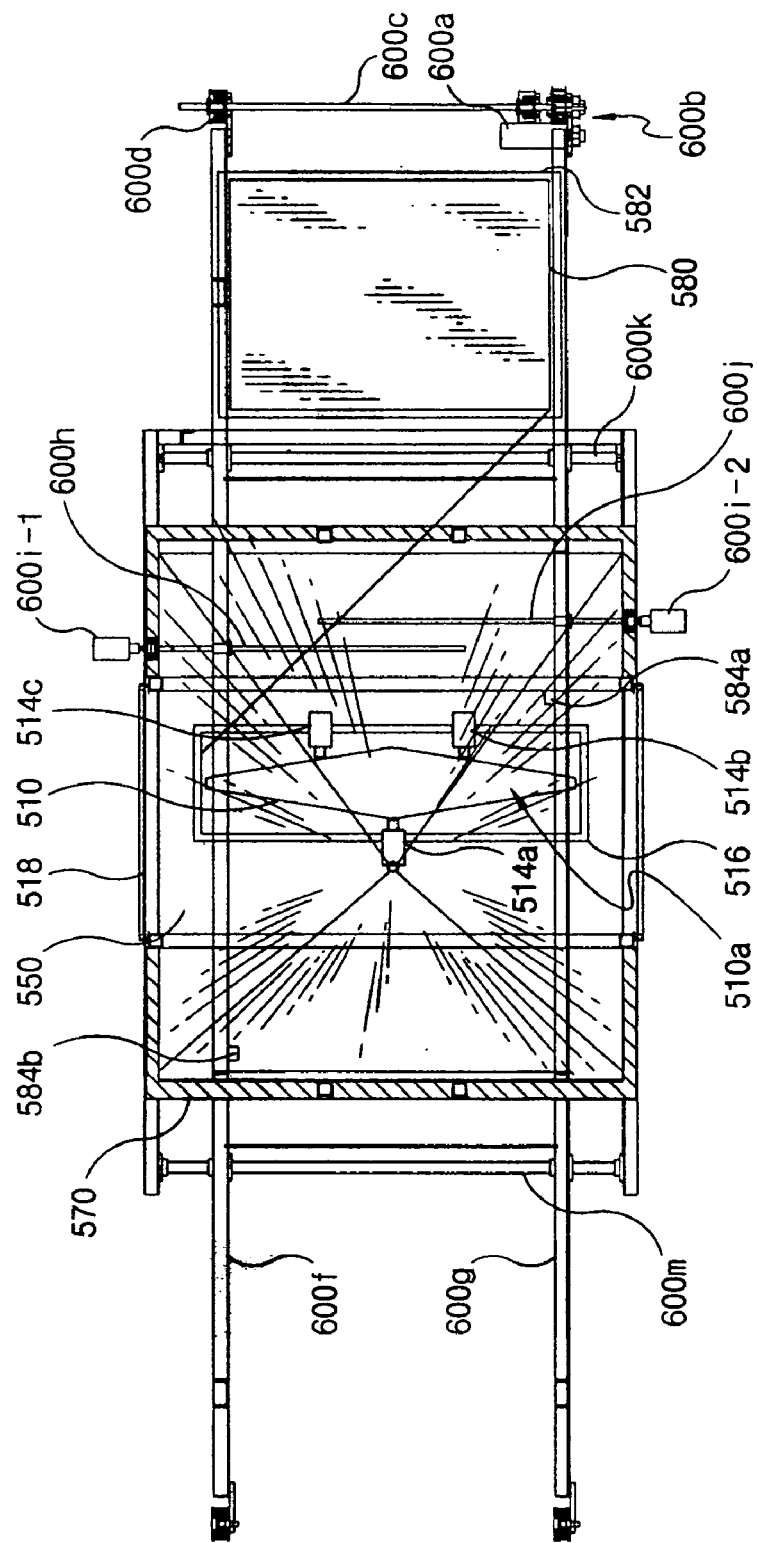
FIG. 24 is a plane view of the light guiding panel manufacturing apparatus shown in FIG. 22 which is seen from the outlet level of the injection pipe.
Figure 25:
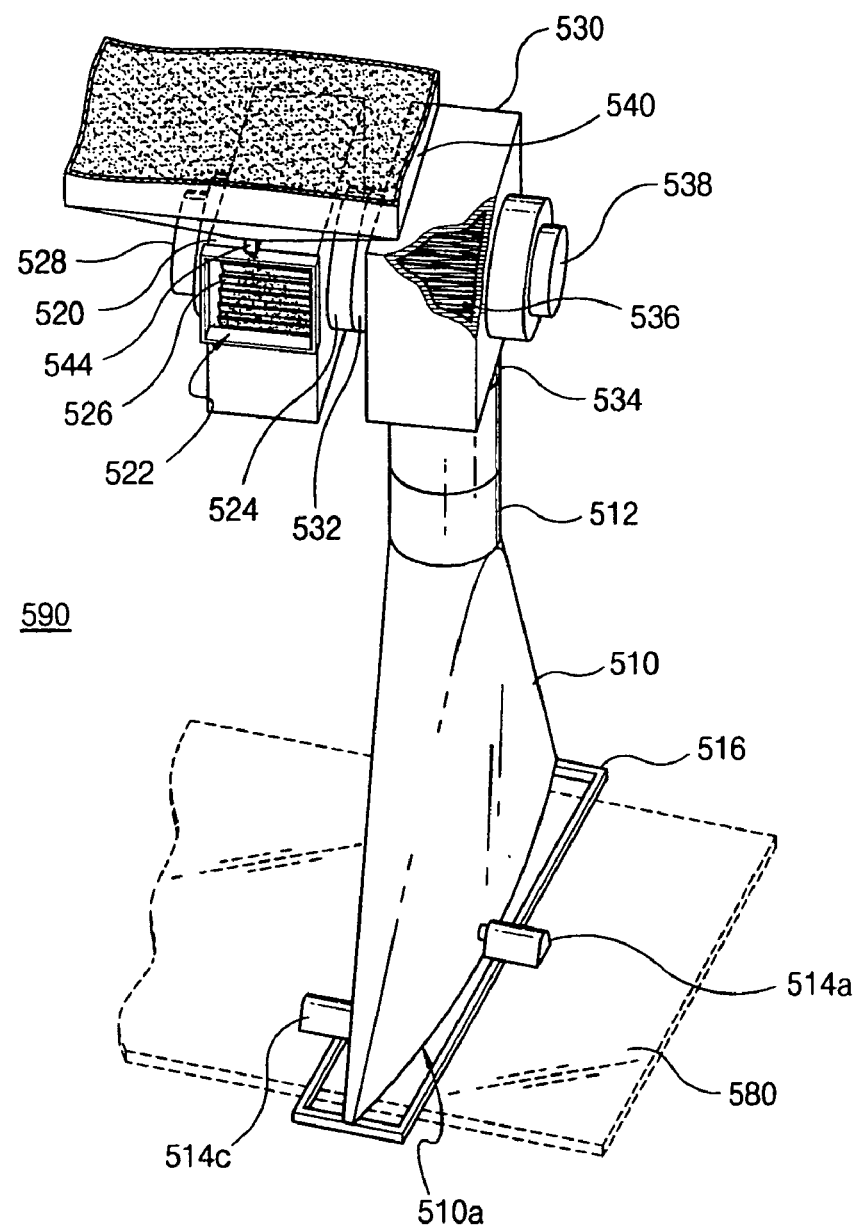
FIG. 25 is a perspective view of major parts of a particle injection apparatus of the light guiding panel manufacturing apparatus shown in FIG. 22.

Next, a third preferred embodiment of the present invention will now be explained. FIGS. 22, 23, and 24 are a side sectional view, a front sectional view, and a plane view, respectively, of the structure of a light guiding panel manufacturing apparatus 500 according to the third preferred embodiment of the present invention. The third embodiment uses a perpendicularly blasting method using a thin funnel-shaped pipe, and the light guiding panel manufacturing apparatus 500 broadly comprises a particle injection apparatus 590 and a transfer apparatus 600.

The transfer apparatus 600 transfers a transparent substrate 580 in one direction with the transparent substrate 580 placed on the transfer apparatus 600. The transfer apparatus 600 can be implemented as an ordinary conveyer system. More specifically, a pair of guide rails 600*f* and 600*g* that are extended in parallel with each other at a predetermined interval are provided and around the outer surfaces of the rails a transfer belt 600*k* is installed and rotating. At one end of the guide rail 600*g*, a motor 600*a* is installed, and gear assemblies 600*b*, 600*c*, and 600*d*, which are connected to the axis of the motor 600*a* and transfer the rotation power of the motor 600*a* to the transfer belt 600*k* of the two guide rails 600*f* and 600*g* so that the transfer belt 600*k* rotates, are provided. By perpendicularly penetrating the sides of the two guide rails 600*f* and 600*g*, guide bars 600*k* and 600*m* holds the guide rails 600*f* and 600*g* so that the two guide rails 600*f* and 600*g* maintain the predetermined interval, and at the same time, if external power is applied to the guide rail, the guide bars slide and support the guide rails so that the interval between the guide rails 600*f* and 600*g* can be accurately adjusted. In addition, motors 600*i*-1 and 600*i*-2 for adjusting the interval of the guide rails 600*f* and 600*g*, and gear axes 600*h* and 600*j* are provided. The gear axis 600*h* is extended in the direction of the axis of the motor 600*i*-1 and coupled with the guide rail 600*f* with gears, while the gear axis 600*j* is extended in the direction of the axis of the motor 600*i*-2 and coupled with the guide rail with gears. If the gear axes 600*h* and 600*j* are rotated by driving the motors 600*i*-1 and 600*i*-2, the guide rails 600*f* and 600*g* can be pulled or pushed such that the interval between the two guide rails can be adjusted. Preferably, the interval of the two guide rails 600*f* and 600*g* is designed so that a transparent substrate of a maximum size can be accommodated.

The transparent substrate 580 is placed on the transfer belt 600*k* winding at the external surface of the guide rails 600*f* and 600*g*. In order to prevent the transparent substrate 580 from being bent due to the strong injection pressure of minute particles, preferably, a support plate 582 that can stand a maximum injection pressure without being bent is placed first on the transfer belt 600*k* and then the transparent substrate 580 is put on the support plate 582.

In order to form a desired recess pattern on the transparent substrate 580, preferably, a function by which the transfer speed can be controlled variably is provided. For this, a control unit 610 for automatically controlling the transfer speed is provided. In addition, preferably, on an appropriate location on the transfer line, for example, in front of or at the back of the injection pipe 510, sensors 584*a* and 584*b* for sensing the passage of the transparent substrate 580 are installed. Using a sensing signal from the sensors 584*a* and 584*b*, the control unit 610 controls the transfer speed.

In order to fully automatize the light guiding panel manufacturing process, it is needed to expand the functions of the control unit 610. That is, all the motors provided for the apparatus of the present invention are implemented by servo motors and the apparatus can be constructed so that these servo motors are controlled by the control unit 610 having a function for automatically controlling the operations of the servo motors according to operating conditions set by a user.

The structure of the particle injection apparatus 590 will now be explained. The particle injection apparatus 590 comprises a container 540 which stores minute particles and discharges the minute particles in the air through free-falling through the outlet 542 at the bottom part to the air. Since the minute particles are free-falling from the container 540, the supply amount and injection amount of the minute particles are always constant with respect to time. This point is in common with the previous two embodiments. Preferably, an opening and shutting control unit 544 is installed at the outlet 542. This is for permitting discharge of minute particles by opening the outlet only when the apparatus is operating. This opening and shutting control unit 544 may be implemented by using, for example, a solenoid valve. Also, in order to facilitate smooth discharge of minute particles from the container 540, preferably, a vibrator 546 for vibrating the container 540 is installed on an appropriate location on the outer wall of the container 540.

Minute particles free-falling in the air from the container 540 should be evenly mixed with the high speed flow of air. For this, a mixing transfer unit which, by using an apparatus which generates a high speed air flow and discharge the air flow through the outlet, inhales free-falling minute particles through the entrance, mixes the particles with the high speed air flow, and forcibly discharges the mixed particles through the outlet, is provided. The mixing transfer unit may be implemented by using a blower. The figure shows a structure having two blowers 520 and 530 dependently connected. Each of the blowers 520 and 530 has a roughly cubic internal space with an open entrance 522 and 532 and an open outlet 524 and 534. A rotor 526 and 536 is installed inside the internal space and a motor 528 and 538, whose axis is coupled with the rotor 526 and 536 and which can rotate the rotor 526 and 536 at a high speed, is installed outside the cube. By the operation of the motors 528 and 538, the rotors 526 and 536 rotate at a high speed, and accordingly, the minute particles free-falling near the entrance 522 of the first blower 520 are pulled into the entrance 522, collided with the rotor 526 and with being mixed with high speed air flow, discharged through the outlet 524 at the right-hand side. The air-mixed minute particles discharged through the outlet 524 are again accelerated by the second blower 530 and discharged through the outlet 534. In addition to the structure shown in the figure, the mixing transfer unit may be constructed by using one blower or three or more blowers. Also, though not shown, by using a pipe member which has an aperture formed on the top part, and an air pressure apparatus, such as a compressor, which is connected to the back of the pipe member and supplies compressed air at a high speed to the outlet of the pipe member, the mixing transfer unit may be constructed.

Though injection nozzles are used in the previous two embodiments, the present embodiment is constructed such that minute particles discharged from the mixing transfer unit are injected through a thin-funnel-type injection pipe 510. The injection pipe 510 has an entrance 512 and an outlet 510a that are all open. The entrance 512 is connected to the outlet 534 of the mixing transfer unit. The internal sectional shape of the pipe 510 shows that the thickness decreases and the width increases in the direction to the outlet. Preferably, the outlet 510a of the injection pipe 510 is directed right below and the transparent substrate 580 passes through below the outlet 510a. After free-falling, minute particles are mixed with the high speed air flow and injected at a high speed through the injection pipe 510. The high speed minute particles provided by the mixing transfer unit pass the injection pipe 510 having this shape. Accordingly, the sectional shape formed by the group of minute particles injected from the outlet 510a can be defined by the internal sectional shape and by the sectional shape of the outlet 510 in particular. The sectional shape of the minute particle group of the injection pipe 510 is determined by a distribution pattern of recesses desired to be formed on the transparent substrate 580. In order to improve processing efficiency, preferably, with the transparent substrate 580 passing below the injection pipe 510 once, forming the desired recesses is completed. Considering this, preferably, the width of the outlet of the injection pipe 510 is made not less than the width of the transparent substrate 580.

Preferably, the outlet of the injection pipe 510 is arranged to cover the entire width of the transparent substrate 580 which passes below the injection pipe 510. At this time, since the distribution of recesses of the transparent substrate 580 varies with respect to locations on the surface of the transparent substrate 580, basically the distribution density of recesses should increase as a distance from the location of the optical source increases. Since the distribution density of recesses is proportional to the number of particles passing the inside of the injection pipe 510 in a unit time, the distribution of recesses can be adjusted by varying the shape of the pipeline, that is, the thickness of the injection pipe 510, in the width direction. When the thickness of the transparent substrate 580 is determined variably, the thickness of the injection pipe 510 corresponding to an area where the distribution density of recesses is high is made thick, while the thickness of the injection pipe 510 corresponding to an area where the distribution density is low is made thin.

If sandblasting is performed using this injection pipe 510, the recess profile of the light guiding panel of the present invention described above can be obtained. That is, while particles injected through the center part of the injection pipe 510 are incident on the transparent substrate 580 almost perpendicularly, the incident angle (the angle between the transparent substrate surface and the injection particle's incident path) of injection particles on the transparent substrate 580 gradually decreases with decreasing distance from the side of the injection pipe 510. Also, among the injection particles emitting through the sides of the injection pipe 510, there are many particles bounced by injection particles emitted through the center. These particle suffer loss of kinetic energy. Considering this, the impact on the transparent substrate 580 by injection particles also increases as the incident angle increases (that is, as the distance between emitting particles and the center of the injection pipe 510 decreases), and as a result, the average depth of recesses varies depending on this different impacts.

Therefore, even when the injection pipe 510 of the third embodiment is used, because of the above-mentioned characteristics of the injection amount and incident angle of injection particles, the requirements of the recess profile of the present invention described above can be satisfied.

Figure 26A:
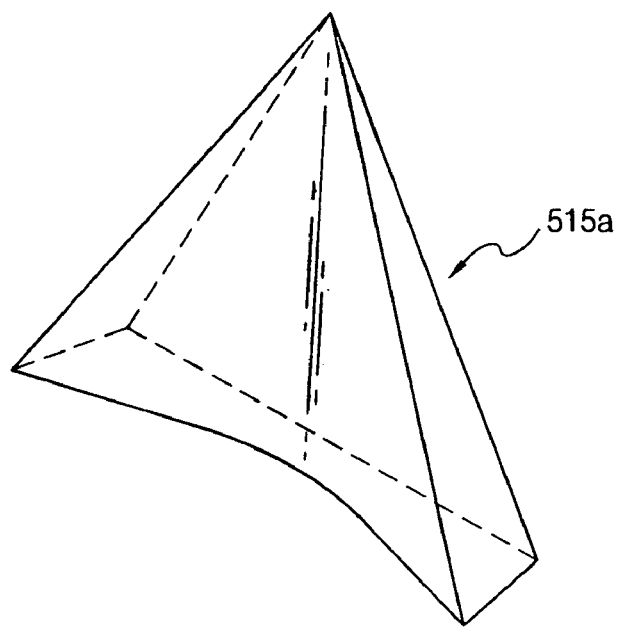
FIGS. 26a and 26b are examples of shapes of a pipeline adjusting member installed inside an injection pipe and FIGS. 26c through 26e are sectionals views taken along the cutting line A–A', of the inside of an injection pipe having a pipeline adjusting member.
Figure 26B:
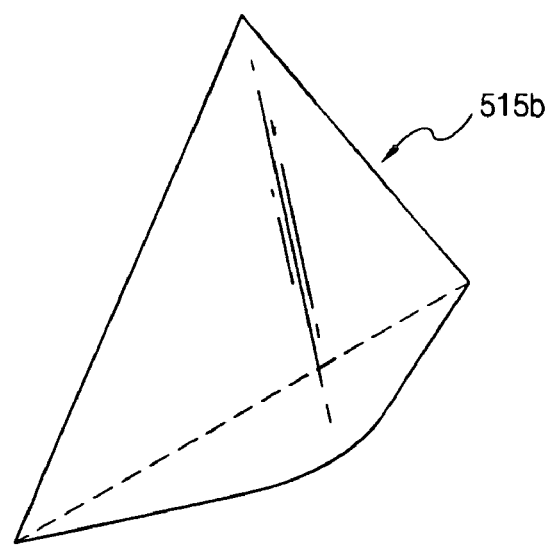

Meanwhile, the adjustment of the thickness of the pipeline of the injection pipe 510 can be achieved in a variety of ways. One method is adjusting the thickness of the outlet 510 of the injection pipe 510. For this, as shown in FIGS. 22 through 25, a support bar 516 is installed surrounding the outlet 510, servo motors 514a through 514c are installed on the support bar 516, and the axis of each motor is connected to a desired position on any one side or both sides. By operating these servo motors 514a through 514c, the thickness of the outlet 510a can be increased or decreased so that a desired shape is obtained. In another method for adjusting the thickness of the pipeline of the injection pipe 510, the thickness of the outlet 510a of the injection pipe 510 is put as is, and pipeline adjusting members 515a and 515b which are shown in FIGS. 26a and 26b are arranged inside the injection pipe 510 so that the shape of the pipeline of the injection pipe 510 is formed as desired.

Figure 26C:
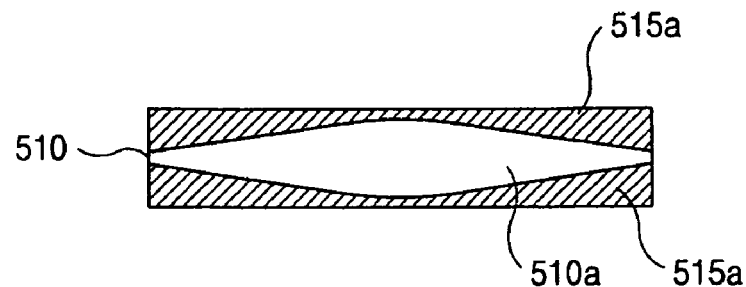
Figure 26D:
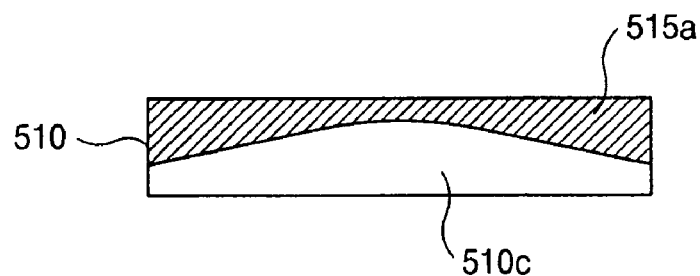
Figure 26E:
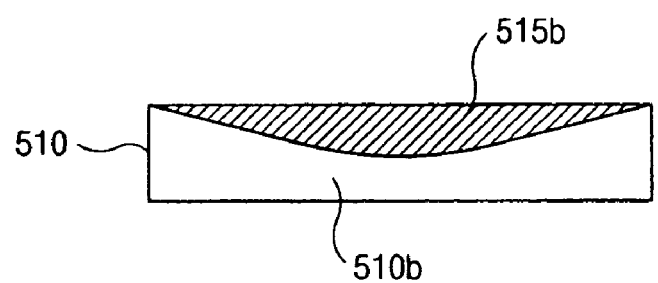

FIGS. 26c through 26e are sectional views of the injection pipe 510 taken along the cutting line A–A' of FIG. 22. FIG. 26c shows a case where two pipeline adjusting members 515a are installed inside the injection pipe 510. The pipeline adjusting member 515a has a thin center and the thickness increases in the side direction. By the pipeline adjusting members 515a, the sectional shape of the injection pipe 510 has a thick center and the thickness decreases in the side direction. FIG. 26d shows a sectional view of the injection pipe 510 when one pipeline adjusting member 515a is installed on the internal wall of the injection pipe 510. FIG. 26e shows a sectional view of the injection pipe 510 when a pipeline adjusting member, which has a thick center and its thickness decreases with increasing distance from the center, is installed inside the injection pipe 510. In the injection pipe 510, a window 511 for observing the state of the inside of the injection pipe 510 or installing a pipeline adjusting member may be formed.

This particle injection apparatus 590 is preferably installed inside a chamber in order to maintain a clean state of a workplace. The chamber 570 is placed on the transfer line of the transfer apparatus 600 and provides a roughly cubic space defined by side walls and a top surface and inside the chamber 570, the particle injection apparatus 590 is installed. The bottom part of the chamber 570 is open and exposed to the transparent substrate such that it induces free-falling of minute particles and dust collided with the transparent substrate 580.

When minute particles are collided with the transparent substrate 580, much dust is generated and floating inside the chamber 570. Accordingly, an appropriate measure to remove dust should be prepared. For this, it is preferable to install a dust removing apparatus 560 which by rotating the motor 564, inhales the air in the chamber 570 through a pipe 562 connected to the chamber 570 and makes the air pass through an internal filter (not shown) so that dust is removed.

For automation of the process, it is preferable that minute particles collided with the transparent substrate 580 is automatically collected and fed back to the container 510. For this, a particle collecting unit 550, which has a roughly funnel shape and is designed to collect free-falling minute particles in one place, is installed below the chamber 570, and the outlet of the particle collecting unit 550 is connected to a collection pump 554 through a collection pipe 552. Minute particles collected by the particle collecting unit 550 are fed back to the container 540 through an outlet pipe extended to the top part of the container 540 by pumping of a collection pump. In order to cut off emission of dust or minute particles, the bottom part of the chamber 570 and the top part of the particle collecting unit 550 are connected by a folding curtain 600m that can be extended or shortened with respect to the width of the transparent substrate 580.

The chamber 570, the minute particle feedback system 550, 552, and 554, and the dust removing system 560, 564, and 562 can be applied to construction of both the previous two embodiments.

Figure 27A:
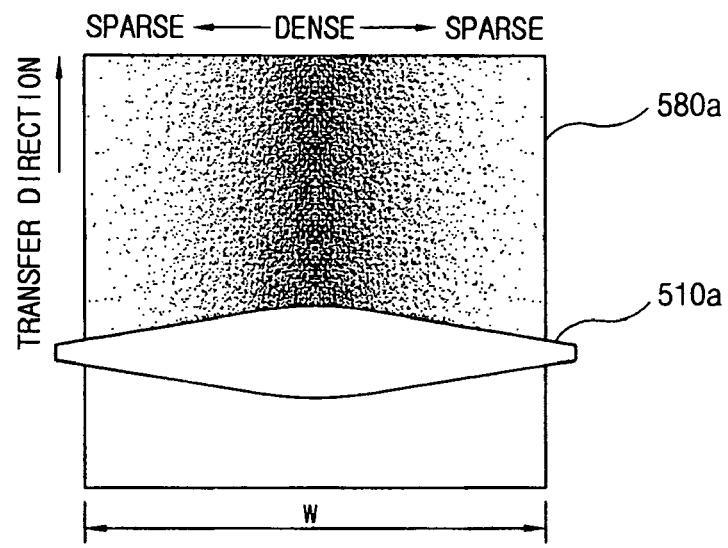
FIG. 27a shows a light guiding panel manufacturing method in which optical sources are arranged at two sides of a transparent substrate facing each other when the transparent substrate is processed by using the light guiding panel manufacturing apparatus shown in FIG. 22.
Figure 27B:
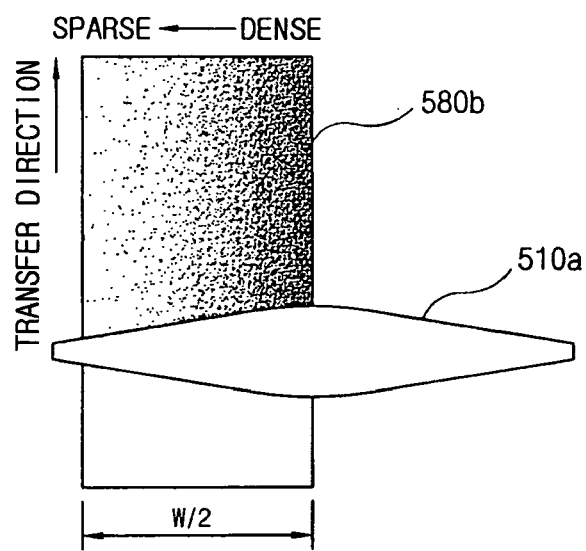
FIG. 27b shows another light guiding panel manufacturing method in which an optical source is arranged at only one side of the transparent substrate.
Figure 28A:
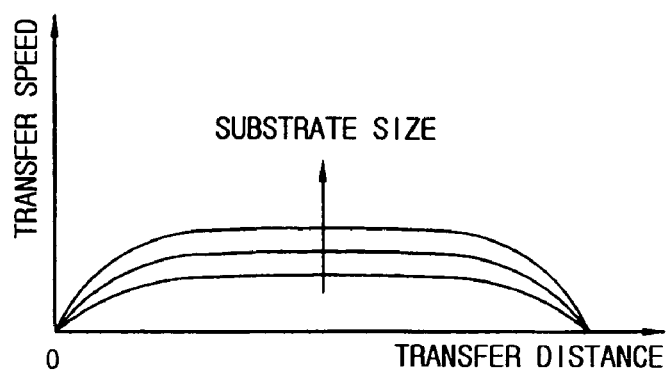
FIG. 28a is a graph showing the relations between the transfer distance and the transfer speed of a transparent substrate with respect to size of the transparent substrate.
Figure 28B:
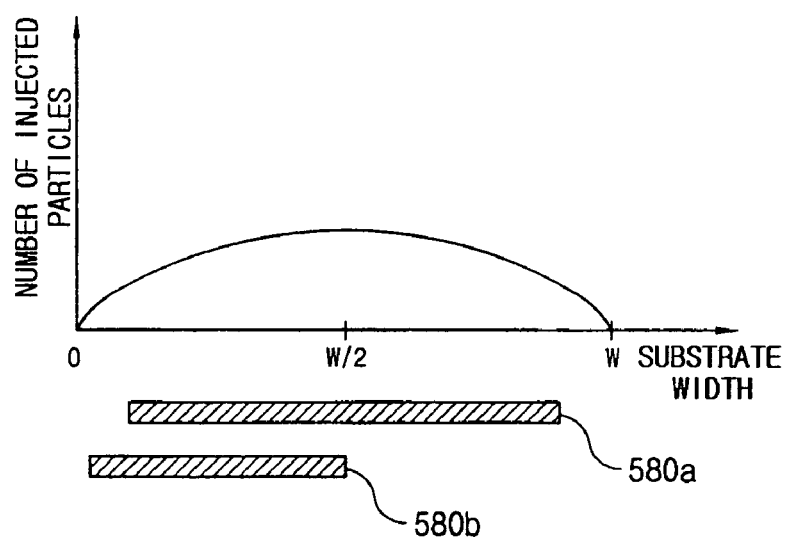
FIG. 28b is a graph showing the changes of outlet section area of an injection pipe in the width direction of a transparent substrate.

FIGS. 27a and 27b show cases where by using the light guiding panel manufacturing apparatus 500 according to the third embodiment, recess forming processing is performed on a transparent substrate. FIG. 27a shows a processing method when optical sources (not shown) are to be arranged at both the right-hand and left-hand sides of the transparent substrate 580a. Here, the distribution density of recesses should increase as a distance from any of both right-hand and left-hand edges of the transparent substrate to the center increases. In order to obtain this distribution, an injection pipe 510, in which the thickness of the center is greater than the thickness of either side, is used as the outlet 510a and the injection pipe 510 is arranged such that the thickest part of the injection pipe 510 corresponds to the center part of the transparent substrate 580a. FIG. 27b shows a processing method when an optical source (not shown) is to be arranged at only the left-hand side of the transparent substrate 580b. In this case, the distribution density of recesses (the number of injected minute particles) should increase as a distance from the right-hand edge decreases. For this, the injection pipe 510 is arranged such that the thickest part of the injection pipe 510 corresponds to the right-hand edge of the transparent substrate 580b. The relations between the number of injection particles and the location in the width direction in the above two cases are shown in FIG. 28b.

Meanwhile, when the arrangement of an optical source is considered in the examples of FIGS. 27a and 27b, if the distribution densities of recesses in the vicinity of the top edge and bottom edge of the transparent substrate are relatively higher than that of the center part, it is advantageous for obtaining uniform brightness, that is, for minimizing the H-beam effect described above. Considering this, and with respect to the transfer speed when the transparent substrate 580 passes below the injection pipe 510, it is needed that the transfer speed at which the vicinity of the top edge and bottom edge of the transparent substrate passes should be lower than the transfer speed at which the center part of the transparent substrate 580 passes, as shown in FIG. 28a.

Referring to preferred embodiments, the present invention has been explained above. However, the present invention is not limited to the preferred embodiments and variations and modifications can be effected within the spirit and scope of the present invention. For example, in the third embodiment, though the figure shows an example case where only one particle injection apparatus 590 is used, a plurality of particle injection apparatuses 590 along the transfer line can be arranged in order to improve productivity of light guiding panel manufacturing. In addition, the outlet of the injection pipe of each of the plurality of particle injection apparatuses can be made to have a different shape with a different width and/or thickness, that is, to have a different graph of FIG. 28b. If a production line is formed such that the transparent substrate 580 passes sequentially a particle injection apparatus having an injection pipe in which the thickness of the outlet rapidly changes and a particle injection apparatus having an injection pipe in which the thickness of the outlet gradually changes, each particle injection apparatus operate complementarily such that a desired recess distribution can be obtained quickly and in addition, a production line which can be elastically applied to a variety of sizes (the size of the transparent substrate 580 varies, for example, from A4 size to a substrate having a several meters long side) can be built.

Also, for example, the number of dust removing apparatuses 560 to be installed may vary with respect to the amount of dust being generated. It is apparent to those skilled in the art that these variations and modifications are within the scope of the present invention.

Also, the photos and measured data on the recess profiles are just examples and it should be noted that if only the requirements for the recess profile are satisfied, the objective of the present invention can be achieved. Therefore, the measured data should not be interpreted as putting any restrictions on the scope of the present invention.

Industrial Applicability

According to the light guiding panel having a recess profile proposed by the present invention, even without using a diffusion sheet, almost uniform planar light evenly diffused without deviation by an afterimage or spots is obtained through the front bottom surface of the light guiding panel. Accordingly, if a backlight unit for an LCD panel is constructed using the light guiding panel of the present invention, a diffusion sheet is not needed. Also, if the light guiding panel is used for a backlight for an advertising film, the diffusion sheet is not needed either and the advertising film can be attached directly on the light guiding panel and be used. Since the diffusion sheet is not used, optical efficiency is greatly improved such that the screen of an LCD panel or an advertising film is shown very clearly. Particularly, since a clear advertising screen can be produced, it can be widely used as a high-grade advertising apparatus. In addition, since the diffusion sheet is not needed, the light guiding panel can be made a slimmer type.

Furthermore, due to easiness of the manufacturing process, it is possible to produce enlarged light guiding panels. That is, by using the transfer apparatus, the manufacturing apparatus described above can continuously process light guiding panels to form recesses such that mass processing is possible and production cost can be reduced.

Various changes in form and details may be made without departing from the spirit and scope of the present invention as defined by the appended claims. Therefore, it should be noted that all variations included in the meaning or scope equivalent to the claims are all included in the scope of the present invention.

The invention claimed is:

1. A light guiding panel which is made as a transparent substrate of a thin hexahedron shape and reflects source light that is incident through at least one side so that the light is emitted to a front surface of the substrate,
   wherein countless minute recesses are formed by a sandblasting method in random shapes on a flat bottom surface of the substrate so as to disperse the source light to be guided to the front surface of the substrate, where the sandblasting method is controlled to ensure that an injection amount of minute particles is constant with time through a process of forming the recesses so that the number of the minute particles impinging on a unit area of the bottom surface of the substrate in a unit time and the impact force on the bottom surface of the substrate by the minute particles gradually increase as a distance from the side, through which the source light is incident, increases, each of the recesses being too small to be seen with the naked eye and no visible light spot by each of the recesses appears on the front surface of the light guiding panel when the source light is incident through the side of the light guiding panel, and the countless minute recesses on the bottom surface of the substrate forming a gradation pattern such that the density of the minute recesses, the arithmetical average roughness Ra and the maximum height Ry of the bottom surface of the substrate, and the mean value of a contour size of the recesses gradual increase, as a distance from the side of the light guiding panel, through which the source light is incident, increases.

2. The light guiding panel of claim 1, wherein the minute particles used for the sandblasting method are selected from the particles of size 100–200 mesh.

3. The light guiding panel of claim 1, wherein the average complexity of the contours of the recesses and a recess surface profile gradually increases as a distance from the vicinity of the side, through which the source light is incident, increases.

4. The light guiding panel of claim 1, wherein when recesses are processed by using the sandblasting method, in order to maintain a constant amount of injected minute particles, minute particles are made to follow a stage of free-falling in a process for injecting the minute particles.

5. The light guiding panel of claim 1, wherein the transparent substrate is made of acryl resin.

6. A backlight apparatus using the light guiding panel claimed in claim 1, comprising:
   a tube optical source which is arranged parallel to and along at least any one side or both sides of the light guiding panel, and if electric power is supplied, generates light so that the light is incident into the light guiding panel through the side of the light guiding panel;
   a reflection portion which surrounds the optical source such that the light of the optical source is reflected into the light guiding panel;
   a bottom surface reflection plate which is attached to the bottom surface of the light guiding panel so as to reflect light which passes through the bottom surface, back into the light guiding panel; and
   a side reflection plate which is attached to sides of the light guiding panel, at which the optical source is not installed, and reflects light incident on the side reflection plate into the light guiding panel,
   wherein without placing a diffusion sheet on the front surface of the light guiding panel, the backlight apparatus is used as a backlight for a transparent or translucent printed film or a liquid crystal display (LCD) unit.

7. The backlight apparatus of claim 6, further comprising:
   an assembly frame which accommodates the light guiding panel, the tube optical source coupled with the light guiding panel, the reflection portion, the bottom surface reflection plate, and the side reflection plate, so as to form a single body apparatus.

8. A backlight apparatus using the light guiding panel claimed in claim 2, comprising:
   a tube optical source which is arranged parallel to and along at least any one side or both sides of the light guiding panel, and if electric power is supplied, generates light so that the light is incident into the light guiding panel through the side of the light guiding panel;
   a reflection portion which surrounds the optical source such that the light of the optical source is reflected into the light guiding panel;
   a bottom surface reflection plate which is attached to the bottom surface of the light guiding panel so as to reflect light which passes through the bottom surface, back into the light guiding panel; and a side reflection plate which is attached to sides of the light guiding panel, at which the optical source is not installed, and reflects light incident on the side reflection plate into the light guiding panel, wherein without placing a diffusion sheet on the front surface of the light guiding panel, the backlight apparatus is used as a backlight for a transparent or translucent printed film or a liquid crystal display (LCD) unit.

9. A backlight apparatus using the light guiding panel claimed in claim 3, comprising:

a tube optical source which is arranged parallel to and along at least any one side or both sides of the light guiding panel, and if electric power is supplied, generates light so that the light is incident into the light guiding panel through the side of the light guiding panel;

a reflection portion which surrounds the optical source such that the light of the optical source is reflected into the light guiding panel;

a bottom surface reflection plate which is attached to the bottom surface of the light guiding panel so as to reflect light which passes through the bottom surface, back into the light guiding panel; and a side reflection plate which is attached to sides of the light guiding panel, at which the optical source is not installed, and reflects light incident on the side reflection plate into the light guiding panel, wherein without placing a diffusion sheet on the front surface of the light guiding panel, the backlight apparatus is used as a backlight for a transparent or translucent a liquid crystal display (LCD) unit.

10. A backlight apparatus using the light guiding panel claimed in claim 4, comprising:

a tube optical source which is arranged parallel to and along at least any one side or both sides of the light guiding panel, and if electric power is supplied, generates light so that the light is incident into the light guiding panel through the side of the light guiding panel;

a reflection portion which surrounds the optical source such that the light of the optical source is reflected into the light guiding panel;

a bottom surface reflection plate which is attached to the bottom surface of the light guiding panel so as to reflect light which passes through the bottom surface, back into the light guiding panel; and a side reflection plate which is attached to sides of the light guiding panel, at which the optical source is not installed, and reflects light incident on the side reflection plate into the light guiding panel, wherein without placing a diffusion sheet on the front surface of the light guiding panel, the backlight apparatus is used as a backlight for a transparent or translucent printed film or a liquid crystal display (LCD) unit.

11. A backlight apparatus using the light guiding panel claimed in claim 5, comprising:

a tube optical source which is arranged parallel to and along at least any one side or both sides of the light guiding panel, and if electric power is supplied, generates light so that the light is incident into the light guiding panel through the side of the light guiding panel;

a reflection portion which surrounds the optical source such that the light of the optical source is reflected into the light guiding panel;

a bottom surface reflection plate which is attached to the bottom surface of the light guiding panel so as to reflect light which passes through the bottom surface, back into the light guiding panel; and a side reflection plate which is attached to sides of the light guiding panel, at which the optical source is not installed, and reflects light incident on the side reflection plate into the light guiding panel, wherein without placing a diffusion sheet on the front surface of the light guiding panel, the backlight apparatus is used as a backlight for a transparent or translucent a liquid crystal display (LCD) unit.

12. The backlight apparatus of claim 8, further comprising:

an assembly frame which accommodates the light guiding panel, the tube optical source coupled with the light guiding panel, the reflection portion, the bottom surface reflection plate, and the side reflection plate, so as to form a single body apparatus.

13. The backlight apparatus of claim 9, further comprising:

an assembly frame which accommodates the light guiding panel, the tube optical source coupled with the light guiding panel, the reflection portion, the bottom surface reflection plate, and the side reflection plate, so as to form a single body apparatus.

14. The backlight apparatus of claim 10, further comprising:

an assembly frame which accommodates the light guiding panel, the tube optical source coupled with the light guiding panel, the reflection portion, the bottom surface reflection plate, and the side reflection plate, so as to form a single body apparatus.

15. The backlight apparatus of claim 11, further comprising:

an assembly frame which accommodates the light guiding panel, the tube optical source coupled with the light guiding panel, the reflection portion, the bottom surface reflection plate, and the side reflection plate, so as to form a single body apparatus.

* * * * *